US011808570B2

United States Patent
Beatty et al.

(10) Patent No.: US 11,808,570 B2
(45) Date of Patent: Nov. 7, 2023

(54) SENSOR AND TELEMETRY UNIT (STU) ADAPTED FOR SECURABLE COUPLING TO A FLOATING OBJECT OR BUOYANT AID TO NAVIGATION (ATON) TO OPERATE AS A SELECTIVELY DEPLOYABLE OCEAN DATA ACQUISITION SYSTEM (ODAS)

(71) Applicant: MarineLabs Data Systems Inc., Victoria (CA)

(72) Inventors: Scott Beatty, Victoria (CA); Bryce Bocking, Saanichton (CA)

(73) Assignee: MarineLabs Data Systems Inc.

( * ) Notice: Subject to any disclaimer, the term of this patent is extended or adjusted under 35 U.S.C. 154(b) by 361 days.

(21) Appl. No.: 17/152,423

(22) Filed: Jan. 19, 2021

(65) Prior Publication Data

US 2021/0223041 A1 Jul. 22, 2021

Related U.S. Application Data

(60) Provisional application No. 63/138,326, filed on Jan. 15, 2021, provisional application No. 62/963,861, filed on Jan. 21, 2020.

(51) Int. Cl.
*G01C 13/00* (2006.01)
*G01S 19/42* (2010.01)
(Continued)

(52) U.S. Cl.
CPC .......... *G01C 13/002* (2013.01); *B63B 22/166* (2013.01); *G01S 19/42* (2013.01); *B63B 2022/006* (2013.01)

(58) Field of Classification Search
CPC ............. G01C 13/002; B63B 22/166; B63B 2022/006; G01S 19/42
(Continued)

(56) References Cited

U.S. PATENT DOCUMENTS

D440,171 S 4/2001 Berger-North et al.
8,149,275 B2 4/2012 Harper
(Continued)

FOREIGN PATENT DOCUMENTS

CN 110606167 A 12/2019

OTHER PUBLICATIONS

Aanderaa, Aanderaa, Motus Wave Sensor 5729, Dec. 4, 2020, <http://www.xylem-analytics.com.au/productsdetail.php>.
(Continued)

*Primary Examiner* — Aditya S Bhat
(74) *Attorney, Agent, or Firm* — Craige Thompson; Thompson Patent Law; Timothy D. Snowden

(57) ABSTRACT

Apparatus and associated methods relate to a self-contained ocean data and acquisition module (SCODAM) configured to mount to a floating body and having a sensor array, geospatial locating engine, wave measurement engine, communication engine to transmit collected data to a remote device, an energy conversion module adapted to convert ambient energy inputs into electrical energy, and an energy storage module configured to receive the converted electrical energy and to supply operating power to the SCODAM. In an illustrative example, the SCODAM may be configured to generate a transfer function based on motion characterization data obtained in a training mode corresponding to motion of the floating body in response to perturbation in a predetermined sequence and to apply the transfer function data obtained by the wave measurement engine to determine wave motion. Various embodiments may advantageously facilitate use of an existing floating body as an ocean data acquisition system (ODAS).

20 Claims, 15 Drawing Sheets

(51) Int. Cl.
   B63B 22/16      (2006.01)
   B63B 22/00      (2006.01)
(58) Field of Classification Search
   USPC .......................................................... 702/1
   See application file for complete search history.

(56)                References Cited

U.S. PATENT DOCUMENTS

| | | | |
|---|---|---|---|
| 8,195,395 | B2 | 6/2012 | Teng et al. |
| 8,260,476 | B2* | 9/2012 | Gizara ................... F03D 7/042 |
| | | | 701/484 |
| 9,297,925 | B1 | 3/2016 | Riley |
| 10,697,777 | B1* | 6/2020 | Robertson ............ G01C 21/203 |
| 10,791,445 | B1 | 9/2020 | Schreib et al. |
| 2006/0195263 | A1* | 8/2006 | Meinig .................. G01V 1/008 |
| | | | 702/3 |
| 2006/0215019 | A1 | 9/2006 | Harper |
| 2011/0060525 | A1 | 3/2011 | Teng et al. |
| 2015/0025804 | A1 | 1/2015 | Jones et al. |
| 2018/0275313 | A1* | 9/2018 | Pierik .................... G01S 19/13 |
| 2020/0209429 | A1* | 7/2020 | Pierik .................. G01C 13/002 |

OTHER PUBLICATIONS

Aanderaa, Motus Wave Sensor 5729; Spec Sheet; < http://www.xylem-analytics.com.au/media/pdfs/motus-wave-sensor-5729-spec-sheet3.pdf>; Xylem, 2017.

Aanderaa, SeaGuardII DCP Wave; Spec Sheet; < https://www.aanderaa.com/media/pdfs/d422_aanderaa_seaguardii_dcp_wave.pdf>; Xylem, 2019.

Antoine, et al., The "BOUSSOLE" Buoy—A New Transparent-to-Swell Taut Mooring Dedicated to Marine Optics: Design, Tests, and Performance at Sea. Journal of Atmospheric and Oceanic Technology 2007, 25. < https://doi.org/10.1175/2007JTECHO563.1>.

Armstrong, R., Data Buoys: Sentinels of the Sea. <https://www.boatus.com/expert-advice/expert-advice-archive/2019/december/data-buoys-sentinels-of-the-sea> Dec. 2019.

Bender, et al., A Comparison of Methods for Determining Significant Wave Heights—Applied to a 3-m Discus Buoy during Hurricane Katrina. Journal of Atmospheric and Oceanic Technology 2010, 27 (6), 1012-1028. <https://doi.org/10.1175/2010JTECHO724.1>.

Benoit, et al., Analyzing Multidirectional Wave Spectra: A Tentative Classification of Available Methods. In Proceedings of the 1997 IAHR conference; San Francisco, CA, 1996; p. 158.

Bouchard, et al., Calibration and Field Evaluation of the National Data Buoy Center's New Wave Measurement System, 2018.

Bouchard, et al., Further Study on the Accuracy of NDBC Wave Measurements and Their Possible Impact on Wave Climate Trends, 2019.

Feng, et al., Wave Height Analysis from 10 Years of Observations in the Norwegian Sea. Continental Shelf Research 2014, 72, 47-56. < https://doi.org/10.1016/j.csr.2013.10.013>.

Fugro, Wavescan Buoy; Spec Sheet; 2004, <https://www.bodc.ac.uk/data/documents/nodb/pdf/wavescan_buoy.pdf>.

Hendry-Brogan, M., Design of a Mobile Coastal Communications Buoy, Massachusetts Institute of Technology, 2004, <https://repository.library.noaa.gov/view/noaa/9687/noaa_9687_DS1.pdf#:~:text=Design%20of%20a%20Mobile%20Coastal%20Communications%20Buoy%20by,Science%20in%20Naval%20Architecture%20and%20Marine%20Engineering%20Abstract>.

Hoar, et al., An Autonomous GNSS Wave Sensor Module for Deployment on Existing Buoy Infrastructure: Comparison and Validation of Co-Located GNSS and Accelerometer Directional Wave Sensors. In 2019 IEEE/OES Twelfth Current, Waves and Turbulence Measurement (CWTM); 2019; pp. 1-9, <https://doi.org/10.1109/CWTM43797.2019.8955287>.

Meindl, A. Guide to Moored Buoys and Other Ocean Data Acquisition Systems; DBCP Technical Document; Technical Document 8; Data Buoy Cooperation Panel of the World Meteorological Organization of the Intergovernmental Oceanographic Commission (of UNESCO), 1996; p. 98.

Milburn, et al., ATLAS Buoy-Reengineered for the next Decade. In Oceans 96 MTS/IEEE Conference Proceedings. The Coastal Ocean—Prospects for the 21st Century; IEEE: Fort Lauderdale, FL, USA, 1996; vol. 2, pp. 698-702. <https://doi.org/10.1109/OCEANS.1996.568312>.

Planet Ocean Ltd, DBT-4 GPRS-Iridium-UHF Data Buoy Telemetry Systems; Data Sheet;; 2020, <http://www.planet-ocean.co.uk/PDF/DBT-3%20%20GPRS%20BUOY%20TELEMETRY2.pdf>.

Planet Ocean Ltd., Acoustiboy Passive Acoustic Monitoring (PAM) System; Spec Sheet; 2011, Dec. 4, 2020, <http://planet-ocean.co.uk/PDF/Acoustibuoy.pdf>.

Sauser, B., The Reliability of Tsunami Detection Buoys. MIT Technology Review. Mar. 11, 2011. < https://www.technologyreview.com/2011/03/11/196401/the-reliability-of-tsunami-detection-buoys/>.

Steele, et al., Theory and Application of Calibration Techniques for an NDBC Directional Wave Measurements Buoy. IEEE J. Oceanic Eng. 1985, 10 (4), 382-396. < https://doi.org/10.1109/JOE.1985.1145116>.

Teng, et al., Buoy Vandalism Experienced by NOAA National Data Buoy Center; 2009; p. 8. <https://doi.org/10.23919/OCEANS.2009.5422389>.

XEOS Technologies, Inc. Brizo-X: Directional GNSS Wave Height Sensor. < https://xeostech.com/brizo-x>.

XEOS Technologies, Inc., Brizo Hardware Manual; Manual; 2020, <https://xeostech.com/system/files/2020-11/Brizo_Hardware_User_Manual.pdf>.

XEOS Technologies, Inc., Brizo Product Testing: Halifax Harbour; Case Study; 2017, <https://xeostech.com/brizo-product-testing-halifax-harbour>.

XEOS Technologies, Inc., Brizo Variants Firmware Manual; 2020, <https://xeostech.com/system/files/2020-11/Brizo_Variants_Firmware_Manual.pdf>.

XEOS Technologies, Inc., Brizo-X: Directional GNSS Wave Height Sensor: With Integrated Telemetry Options; Spec Sheet; 2018, <https://xeostech.com/sites/default/files/2019-08/BrizoX%20Brochure%20WEB.pdf>.

Zielinski, S., Did Broken Buoys Fail to Warn Victims of the Mentawai Tsunami <https://smithsonianmag.com/science-nature/did-broken-buoys-fail-to-warn-victims-of-the-mentawai-tsunami-37576333/> Oct. 28, 2010.

* cited by examiner

SENSOR AND TELEMETRY UNIT (STU) ADAPTED FOR SECURABLE COUPLING TO A FLOATING OBJECT OR BUOYANT AID TO NAVIGATION (ATON) TO OPERATE AS A SELECTIVELY DEPLOYABLE OCEAN DATA ACQUISITION SYSTEM (ODAS)

CROSS-REFERENCE TO RELATED APPLICATIONS

This application claims the benefit of U.S. Provisional Application Ser. No. 62/963,861, titled "SENSOR AND TELEMETRY UNIT (STU) ADAPTED FOR SECURABLE COUPLING TO A FLOATING OBJECT OR BUOYANT AID TO NAVIGATION (ATON) TO OPERATE AS A SELECTIVELY DEPLOYABLE OCEAN DATA ACQUISITION SYSTEM (ODAS)," filed by Bryce Bocking, et al., on Jan. 21, 2020.

This application also claims the benefit of U.S. Provisional Application Ser. No. 63/138,326, titled "SENSOR AND TELEMETRY UNIT (STU) ADAPTED FOR SECURABLE COUPLING TO A FLOATING OBJECT OR BUOYANT AID TO NAVIGATION (ATON) TO OPERATE AS A SELECTIVELY DEPLOYABLE OCEAN DATA ACQUISITION SYSTEM (ODAS)," filed by Scott Beatty, et al., on Jan. 15, 2021.

This application incorporates the entire contents of the foregoing application(s) herein by reference.

TECHNICAL FIELD

Various embodiments relate generally to characterizing bodies of water.

BACKGROUND

Various industries and sectors rely on a combination of private entities and governmental organizations to predict weather and environmental changes. For example, shipping industries, airline industries, public protection agencies, emergency response organizations, and policymakers all depend on reliable predictions of weather and environmental changes.

The entities and organizations responsible for those predictions in turn depend on reliable and extensive data networks to provide accurate, real-time, and historical data on various environmental metrics of interest. Monitoring networks may include, for example, land-based, space-based, and water-based monitoring stations. Monitoring stations may be dedicated or multi-purpose. Water-based monitoring stations may, for example, be inland (e.g., in freshwater bodies), coastal, or offshore.

Water based monitoring stations may, for example, include dedicated weather buoys. Weather buoys may, for example, be moored or free-floating. Weather buoys may, for example, monitor various environmental conditions. For example, weather buoys may monitor wind conditions, air quality, wave conditions, water quality, or some combination thereof.

SUMMARY

Apparatus and associated methods relate to a self-contained ocean data and acquisition module (SCODAM) configured to mount to a floating body and having a sensor array, geospatial locating engine, wave measurement engine, communication engine to transmit collected data to a remote device, an energy conversion module adapted to convert ambient energy inputs into electrical energy, and an energy storage module configured to receive the converted electrical energy and to supply operating power to the SCODAM. In an illustrative example, the SCODAM may be configured to generate a transfer function based on motion characterization data obtained in a training mode corresponding to motion of the floating body in response to perturbation in a predetermined sequence and to apply the transfer function data obtained by the wave measurement engine to determine wave motion. Various embodiments may advantageously facilitate use of an existing floating body as an ocean data acquisition system (ODAS).

Various embodiments may achieve one or more advantages. For example, some embodiments may advantageously facilitate rapid deployment of an ODAS on existing floating bodies (e.g., buoys, aids to navigation (AtoNs), boats). Various embodiments may advantageously provide, for example, a single self-contained unit which is hermetically sealed against weather. Various embodiments may advantageously be, for example, mounted to a floating body as a single unit by securing a housing to the floating body. Various embodiments may, for example, facilitate conversion and/or upgrading of an existing floating body to an ODAS without cabling or installation of multiple units.

Various embodiments may advantageously determine wave motion via at least one global navigation satellite system (GNSS), an inertial measurement unit (IMU), or some combination thereof. Various embodiments may advantageously characterize motion of a floating body to which a SCODAM is mounted by generating a transfer function based upon a predetermined sequence of perturbations during a training operation. Various embodiments may apply a transfer function to data received from the wave measurement engine to isolate the wave motion from the floating body motion.

Various embodiments may advantageously, for example, eliminate the need for a separate power source. Various embodiments may, for example, provide operating power to the SCODAM via conversion of ambient energy inputs such as, by way of example and not limitation, light, wind, waves, heat, or some combination thereof. Various embodiments may, for example, advantageously allow a user to connect one or more accessory sensors to a SCODAM. For example, users may advantageously configure accessory sensors above water level, at water level, below water level, or some combination thereof.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a self-contained ocean data acquisition module (SCODAM) and associated ocean data acquisition system (ODAS) is introduced with reference to FIG. 1A. Second, that introduction leads into a description with reference to FIGS. 1B-3C of some exemplary embodiments of SCODAMs and associated ODASs. Third, with reference to FIG. 4, an exemplary SCODAM component configuration is described. Fifth, and with reference to FIG. 5, this document describes exemplary apparatus and methods useful for ocean data acquisition using SCODAMs. Sixth, with reference to FIG. 6, an exemplary method of deploying a SCODAM on a floating body is discussed. Finally, the document discusses further embodiments, exemplary applications and aspects relating to SCODAMs and associated ODASs.

Figure 1A:
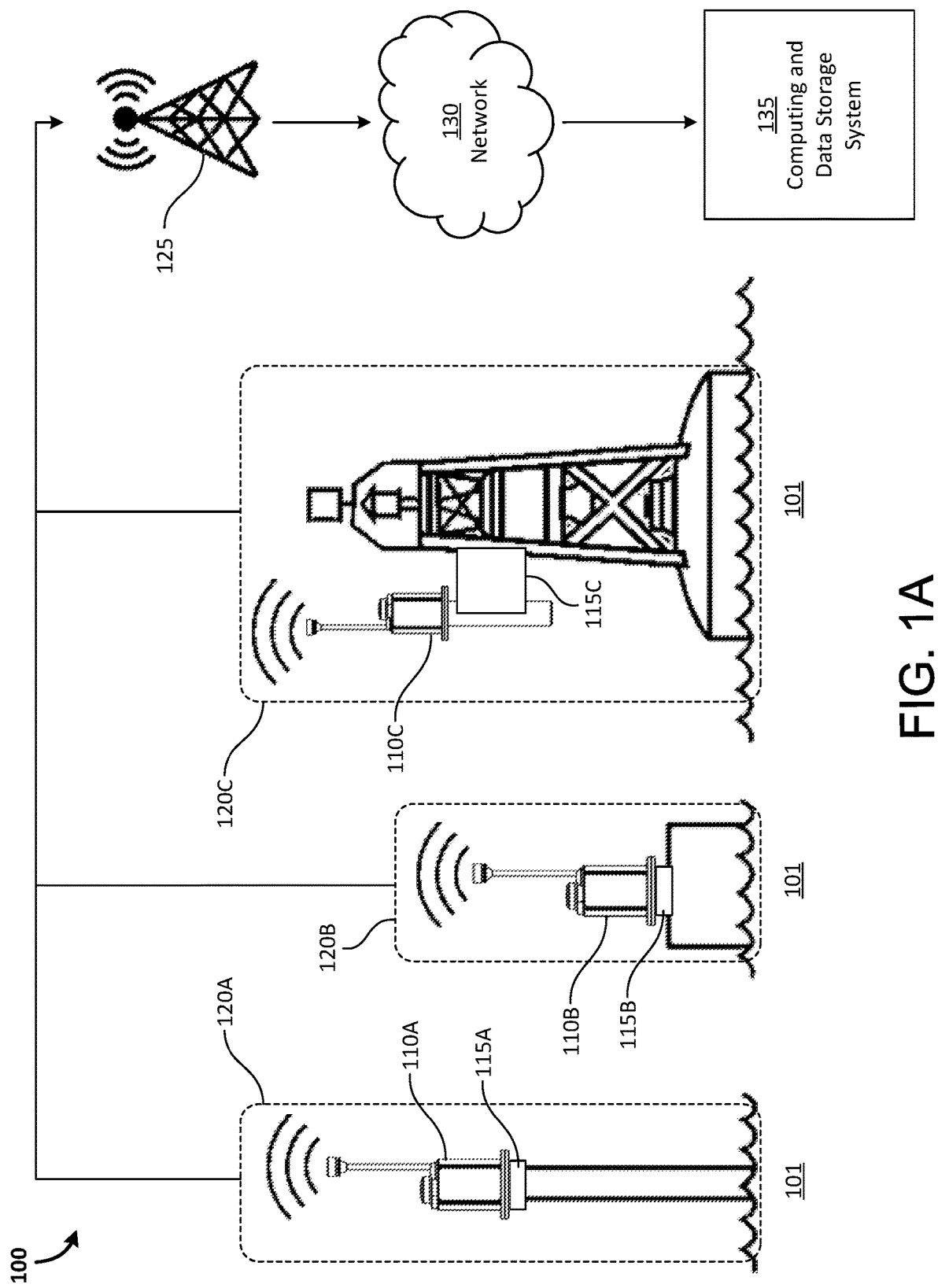
FIG. 1A depicts elevational views of three exemplary self-contained ocean data acquisition modules (SCODAMs) configured to perform sensor and telemetry operations, and each securably coupled to an associated floating body, each SCODAM and associated floating body functioning as a selectively field-deployed ocean data acquisition system (ODAS).

FIG. 1A depicts elevational views of three exemplary self-contained ocean data acquisition modules (SCODAMs) configured to perform sensor and telemetry operations, and each securably coupled to an associated floating body, each SCODAM and associated floating body functioning as a selectively field-deployed ocean data acquisition system (ODAS). In an exemplary deployment scenario 100, there is a body of water 101, such as an ocean, sea, or lake, for example. Floating on the body of water 101 are three distinct floating bodies. As depicted, the floating bodies are aids to navigation (AtoNs) 105A, 105B, and 105C. Securely coupled to each AtoN 105A, 105B, and 105C is an associated SCODAM 110A, 110B, and 110C, including components configured to perform sensor and telemetry functions. Each SCODAM 110A-110C is configured to convert virtually any floating object (such as the AtoNs 105A-105C) into an ocean data acquisition system (ODAS). Secure couplers 115A, 115B, and 115C (also referred to herein as mechanical interfaces) are each configured to securely couple/mount an associated SCODAM 105A, 105B, and 105C to an associated/assigned AtoN 110A, 110B, and 110C, respectively. When coupled to an associated AtoN 105A-105C (via associated secure couplers 115A-115C), each SCODAM 110A-110C advantageously functions as a "smart" telemetry-cloud ODAS 120A, 120B, and 120C, respectively, configured to transmit wave, wind, and/or other (oceanographic) measurements to a remote location, such as a radio cell tower base station 125, for example. The receiver unit/base station 125 transmits the received telemetry data to a network 130 (e.g., the Internet), which then routes the telemetry data to a (cloud) computing and data storage system 135. The (cloud) system 135 may ingest, store, and processes the data, while a remote display unit (not shown) may display the data for one or more particular users. Accordingly, the converted telemetry-cloud ODASes 120A, 120B, and 120C may load the cloud system 135 with, for example, gigabytes of data from which a body of water characterization may be advantageously derived, to qualify and quantify the unique characteristics and parameters of the monitored body of water 101.

In the illustrative depiction of FIG. 1, the first AtoN 105A is a "spar type" marker buoy, the second AtoN 105B is a "can-type" marker buoy, while the third AtoN 105C is a floating navigational aid (with light and/or other navigational features). Furthermore, a first secure coupler 115A is a metal interface plate, a second secure coupler 115B is a flanged interface plate and a third secure coupler 115C is a U-bolt and/or clamp-style fastener. In an illustrative aspect, each SCODAM 110A-110C may include physical hardware (e.g., microcontroller, processor/CPU, memory, electronic boards, IO), an array of sensors configured to sense a variety of measurable parameters (e.g., wind speed, wave motion), software configured to interface with the sensors (for data collection, storage, and transmission), and at least one transmitter configured to transmit telemetry data from the SCODAM to a receiver station (such as the radio cell tower base station 125, for example).

In some embodiments, an AtoN may (more generally) be a buoyant object that floats on the surface of a (generic) body of water, and may be either drifting, or attached to a mooring, in various implementations. Examples of such buoyant/floating objects may include buoys, boats, and other floating (e.g., man-made) structures, such as boat docks and offshore platforms. The phrase ocean data acquisition system (ODAS), in various implementations, may more generally refer to data acquisition systems applied to any generic body of water 101 (e.g., lakes, streams, ponds), not just oceans specifically. Therefore, the term "ocean," in this context, is not meant to be construed as limiting in scope of suitable body of water applications for methods and systems disclosed herein.

Figure 1C:
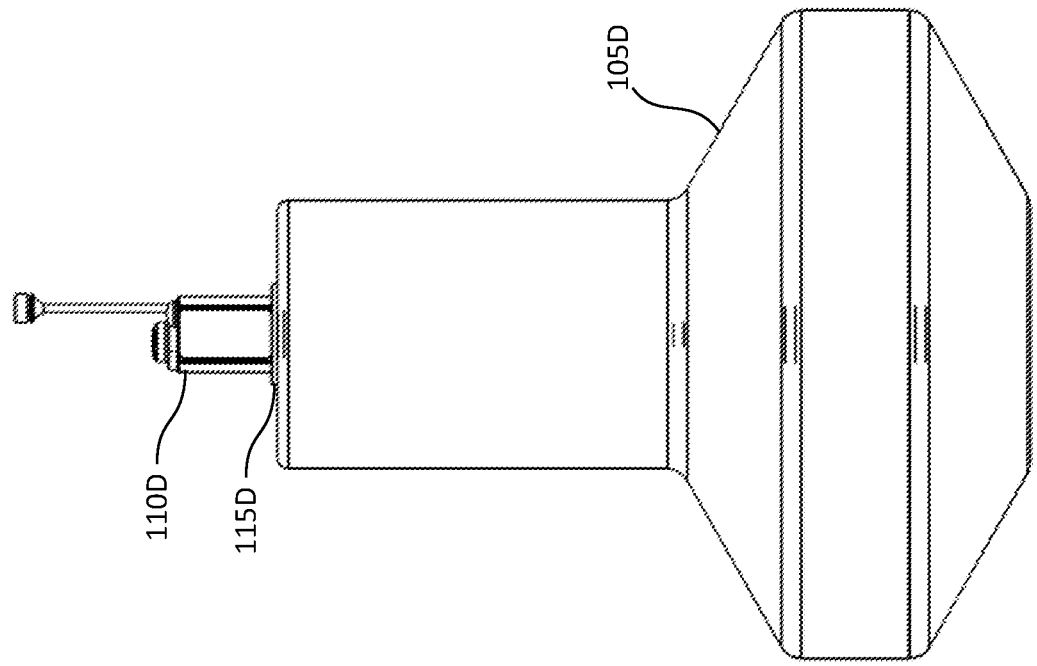
FIGS. 1B and 1C depict top perspective and side elevational views, respectively, of an exemplary embodiment of a SCODAM, an associated floating body, and a secure coupler configured to securely couple the SCODAM to the floating body.
Figure 1B:
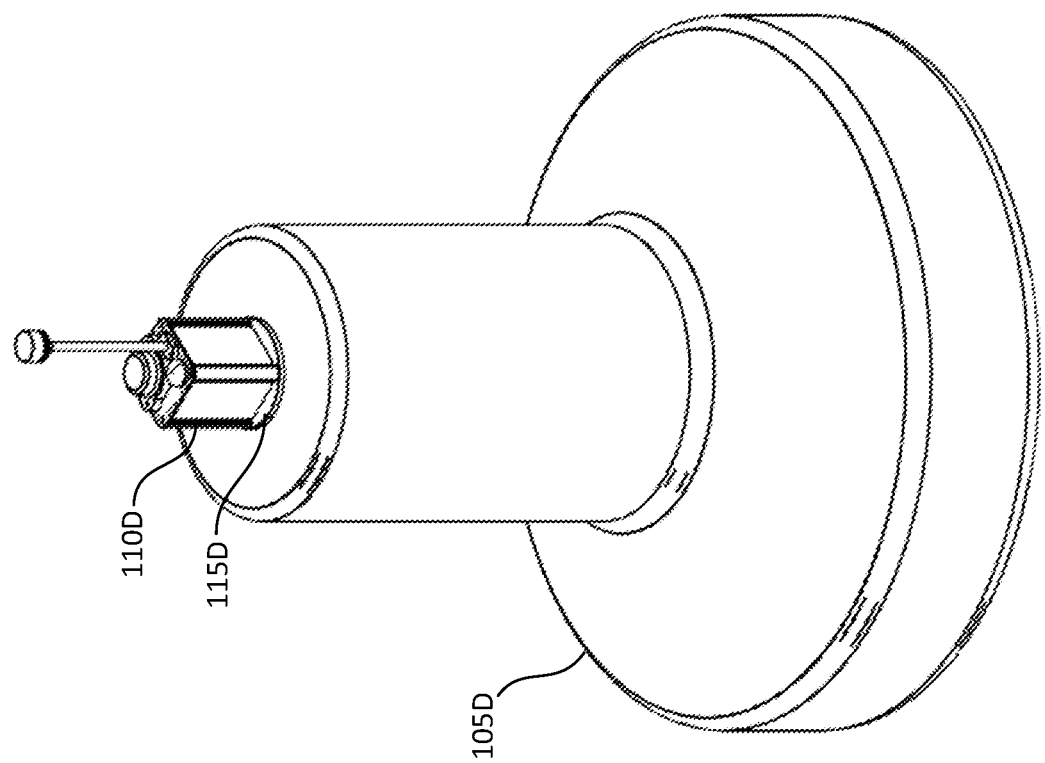

FIGS. 1B and 1C depict top perspective and side elevational views, respectively, of an exemplary embodiment of a SCODAM, an associated floating body, and a secure coupler configured to securely couple the SCODAM to the floating body. A floating body 105D is shown with a SCODAM 110D mounted atop the floating body 105D. The floating body 105D may, for example, be an AtoN. The SCODAM 110D is securely and mechanically coupled to the AtoN 105D via a secure coupler 115D. The secure coupler 115D, in this embodiment, is a bolt-down interface (e.g., having a metal plate or flange that is bolt-fastened to the AtoN).

Figure 1E:
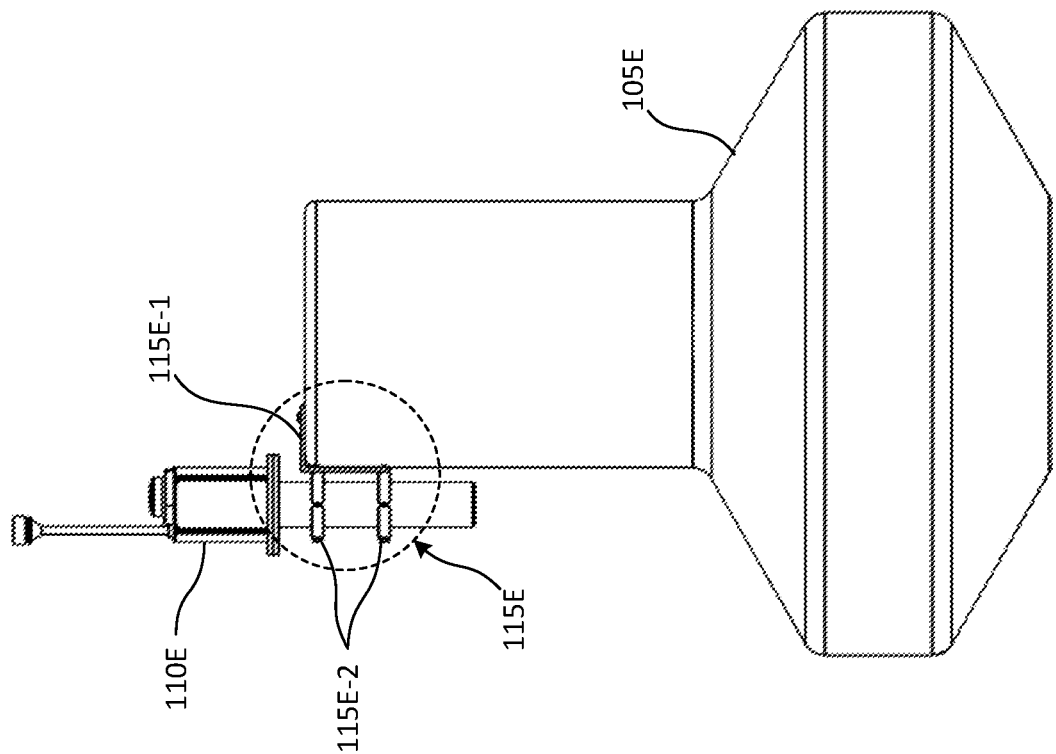
FIGS. 1D and 1E depict top perspective and side elevational views, respectively, of an exemplary embodiment of a SCODAM, an associated floating body, and a secure coupler configured to securely couple the SCODAM to the floating body.
Figure 1D:
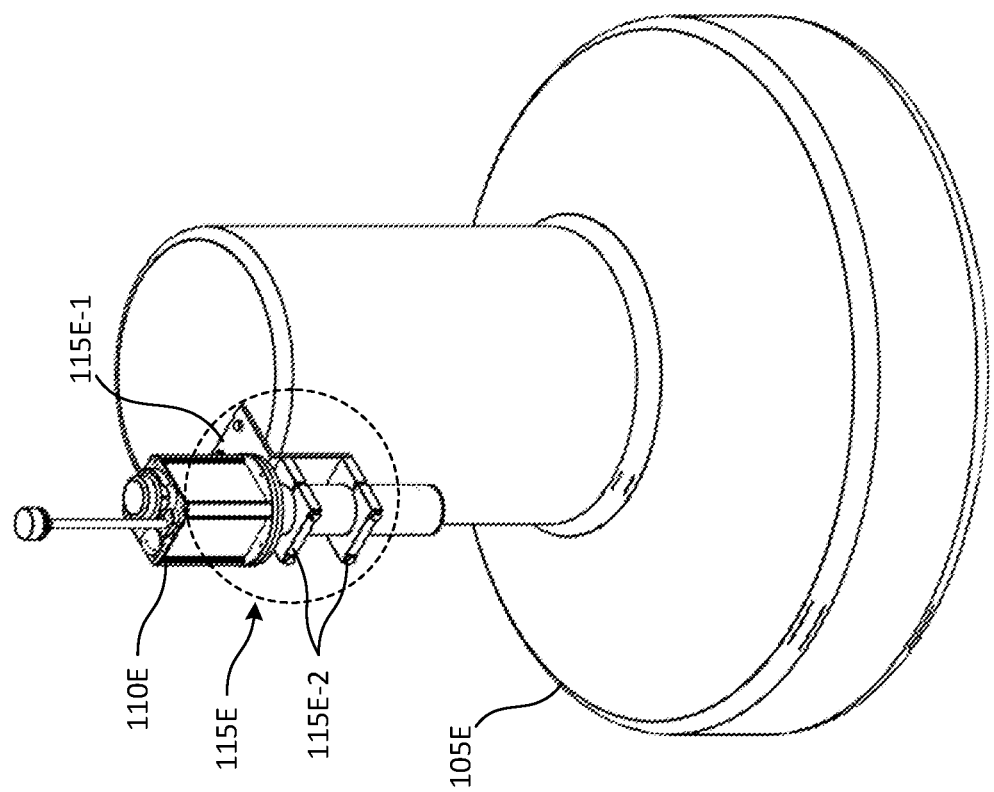

FIGS. 1D and 1E depict top perspective and side elevational views, respectively, of an exemplary embodiment of a SCODAM, an associated floating body, and a secure coupler configured to securely couple the SCODAM to the floating body. A floating body 105E (e.g., an AtoN) is shown with a SCODAM 110E mounted atop the AtoN 105E. The SCODAM 110E is securely and mechanically coupled to the AtoN 105E via a secure coupler 115E. The secure coupler 115E, in this embodiment, is a bolt-down bracket and clamp connection, having a bolted-down mounting bracket 115E-1 attached to the AtoN 105E, and a pair of clamps 115E-2 fixed to the bracket 115E-1 and clampingly coupled with the SCODAM 110E.

Figure 1G:
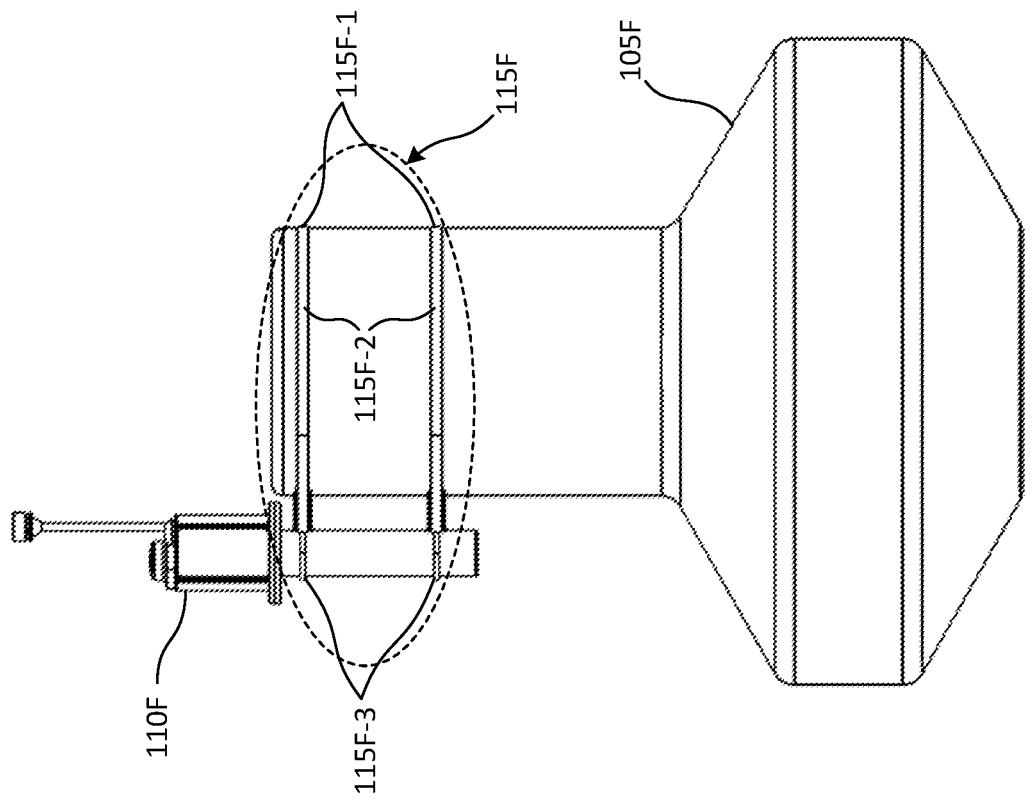
FIGS. 1F and 1G depict top perspective and side elevational views, respectively, of an exemplary embodiment of a SCODAM, an associated floating body, and a secure coupler configured to securely couple the SCODAM to the floating body.
Figure 1F:
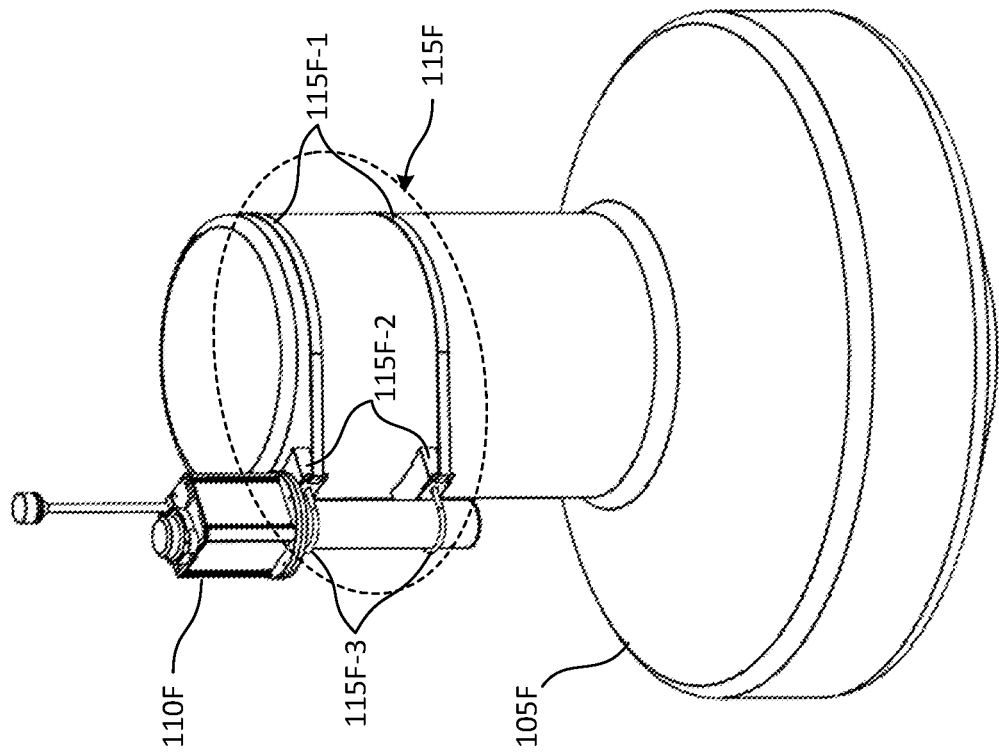

FIGS. 1F and 1G depict top perspective and side elevational views, respectively, of an exemplary embodiment of a SCODAM, an associated floating body, and a secure coupler configured to securely couple the SCODAM to the floating body. A floating body (e.g., AtoN) 105F is shown with a SCODAM 110F mounted atop the AtoN 105F. The SCODAM 110F is securely and mechanically coupled to the AtoN 105F via a secure coupler 115F. The secure coupler 115F, in this embodiment, is a U-bolt and strap assembly, having a pair of tensionable (metal) straps 115F-1, a pair of receiver brackets 115F-2, and a pair of U-bolts 115F-3. The straps 115F-1 are securely wrapped and tensioned around the AtoN 105F, the brackets 115F-2 couple with the straps 115F-1, and the U-bolts 115F-3 fasten to the brackets 115F-2 to securely retain the SCODAM 110F to the AtoN 105F.

Various embodiments may advantageously enable rapid and cost-effective field conversion of existing floating bodies to an ODAS. Various embodiments may, for example, reduce cost of maintenance and repair, reduce duration of repair, maintenance, and/or deployment trips, or some combination thereof. In various embodiments, a compact and self-contained housing may, by way of example and not limitation, eliminate or greatly reduce field maintenance requirements. For example, maintenance staff (e.g., in a vessel) may simply replace a SCODAM requiring maintenance as a single, self-contained unit by dismounting the existing SCODAM and mounting a replacement, and taking the previous SCODAM back to shore or onboard a vessel for servicing at the staff's leisure. Various embodiments may, for example, enable the number of ODASs deployed to be cost-effectively increased. A cost-effective SCODAM and/or increased number of ODASs may, by way of example and not limitation, decrease vandalism and/or the effects of vandalism on critical ODAS infrastructure (e.g., severe storm warning systems, weather prediction systems). Accordingly, various embodiments may advantageously increase public safety, save lives, decrease property damage, or some combination thereof.

Figure 2A:
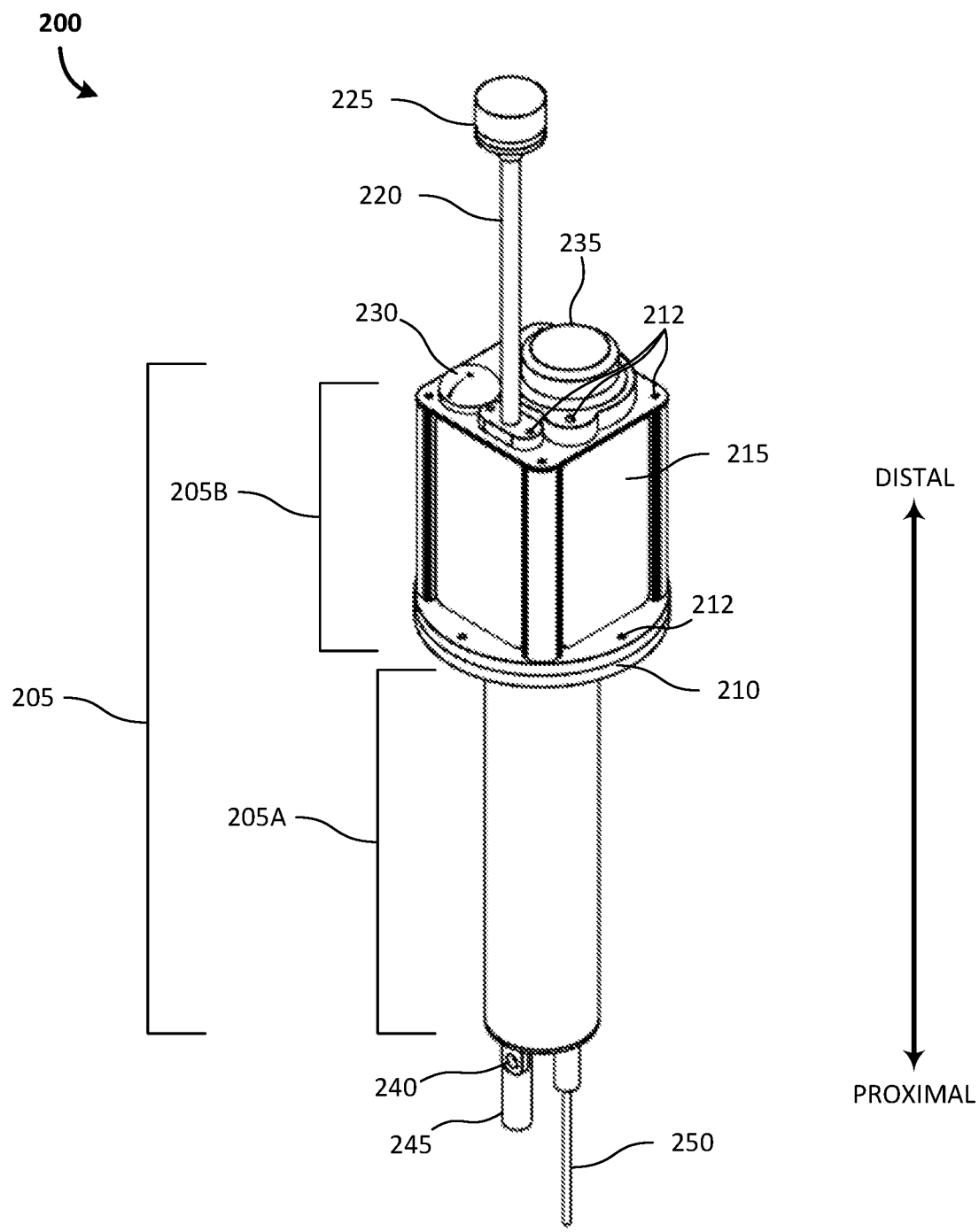
FIGS. 2A and 2B depict a top perspective view and side elevational view, respectively, of an exemplary SCODAM 200 adapted to securely couple to a floating body.
Figure 2B:
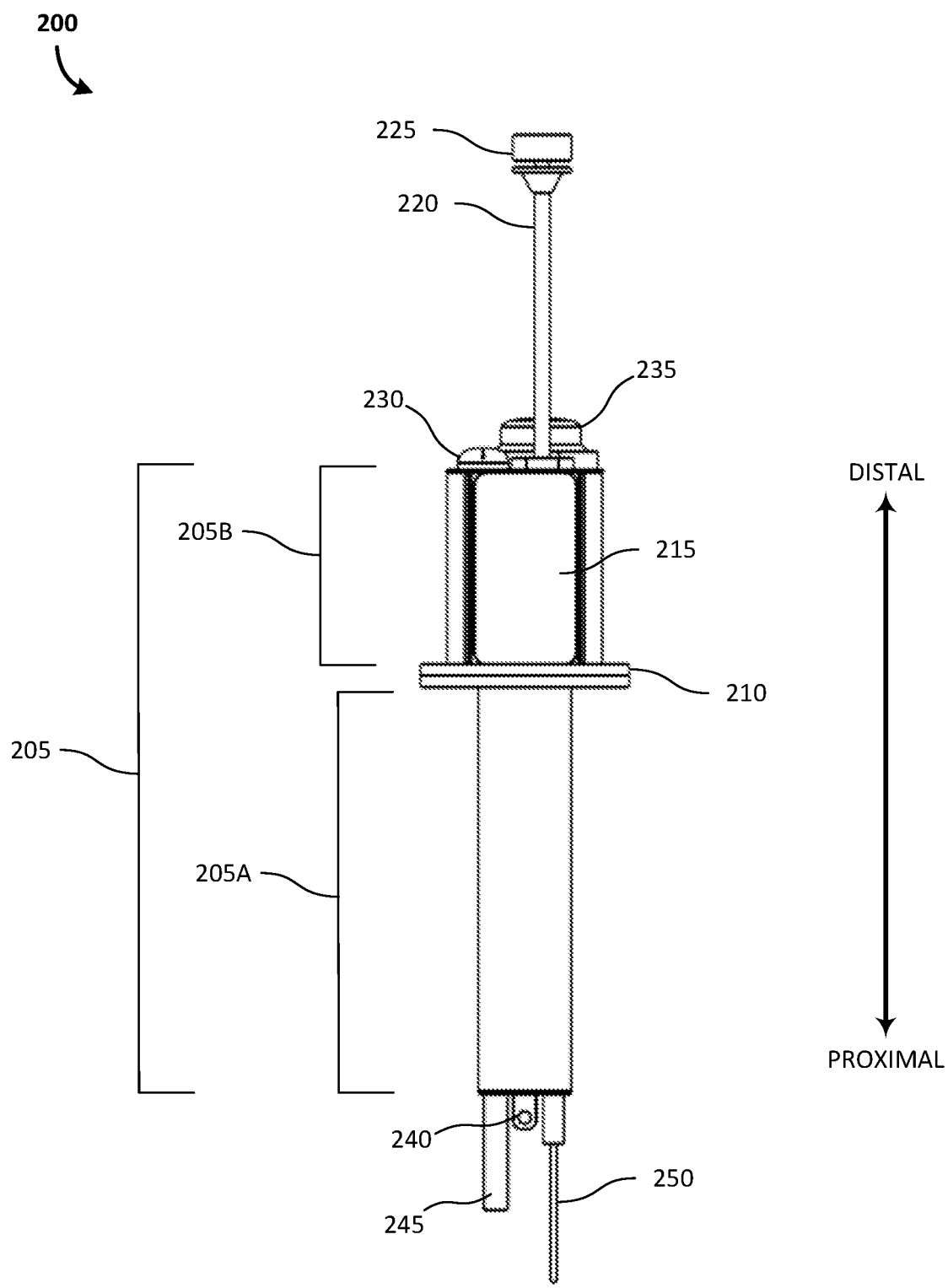
Figure 2C:
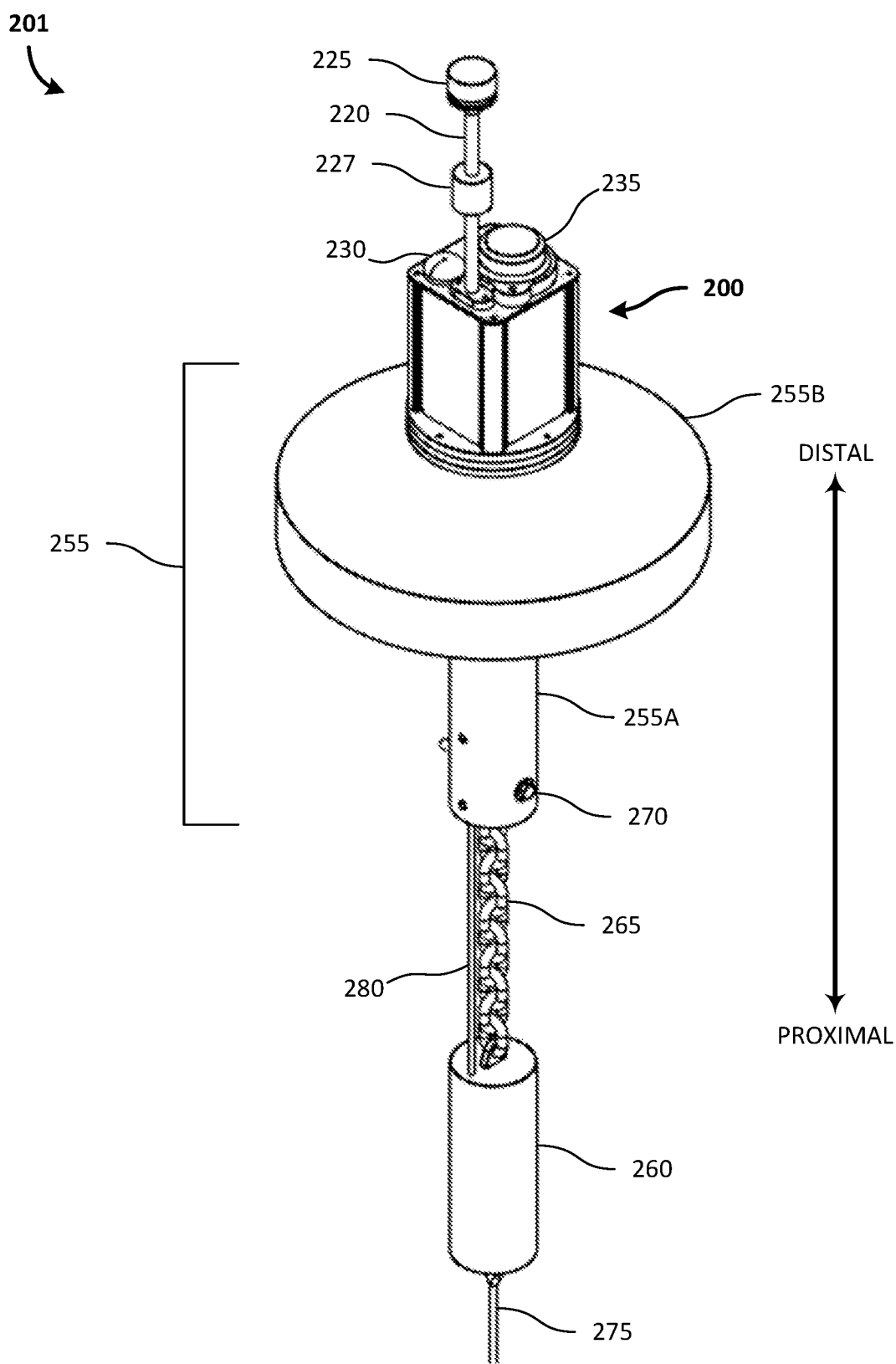
FIGS. 2C, 2D, and 2E depict a top perspective view, side elevational view, and side cross-sectional view, respectively, of the exemplary SCODAM 200 of FIGS. 2A-B securably and releasably coupled to an exemplary flotation device 255, which collectively form an exemplary ocean data acquisition system (ODAS) assembly 201.
Figure 2D:
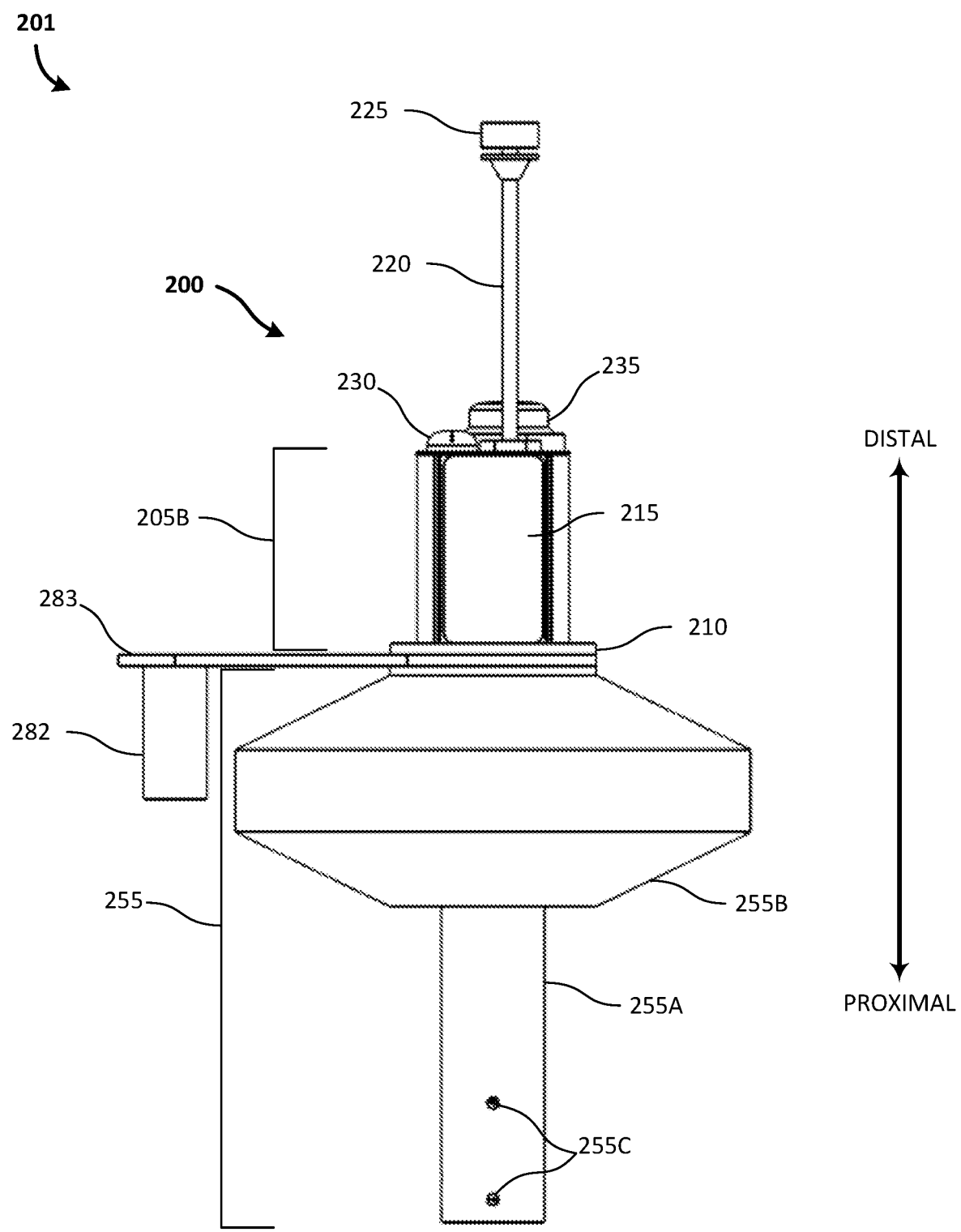
Figure 2E:
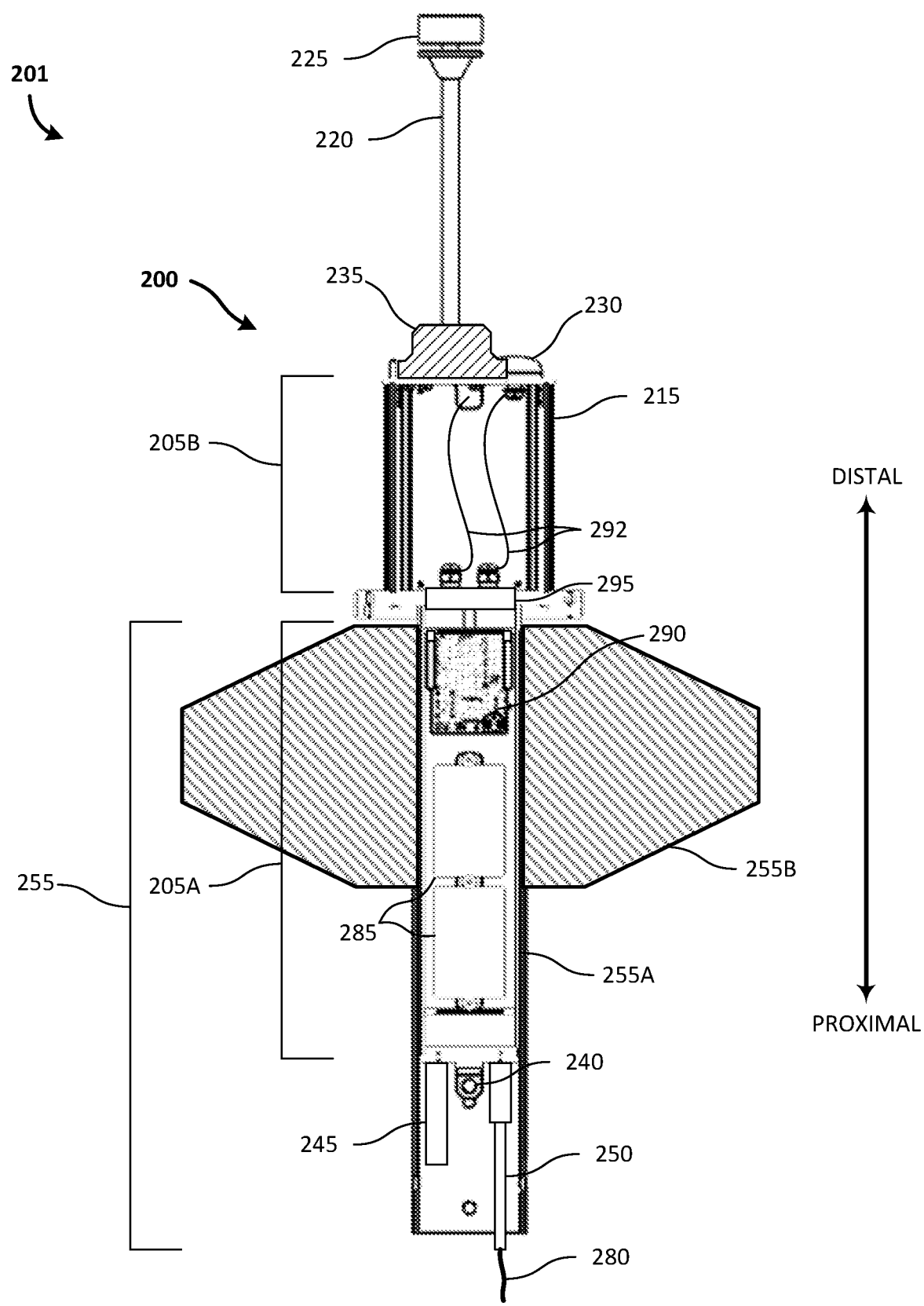

FIGS. 2A and 2B depict a top perspective view and side elevational view, respectively, of an exemplary SCODAM 200 adapted to securely couple to a floating body. FIGS. 2C, 2D, and 2E depict a top perspective view, side elevational view, and side cross-sectional view, respectively, of the exemplary SCODAM 200 of FIGS. 2A-B securably and releasably coupled to an exemplary flotation device 255, which collectively form an exemplary ocean data acquisition system (ODAS) assembly 201. A SCODAM 200, configured to act at least as a sensor and telemetry unit, includes a housing or casing 205, including a lower housing/casing 205A and an upper housing/casing 205B. The lower and upper housings 205A, 205B may cooperate to form a waterproof sealed and rigid housing for the internal components of the SCODAM 200. The lower and upper housings 205A, 205B may, for example, further cooperate to form a hermetically sealed housing for the internal components of the SCODAM 200. In various examples, the housing of the SCODAM 200 may be, for example, in the shape of a canister with seals. As shown in FIGS. 2A and 2B, a top flange of the bottom housing 205A may form a sealed (flange) interface 210 with a bottom flange of top housing 205B (e.g., through compressive contact between the flanges via tightened fasteners such as screws, bolts, rivets) to form a canister-profiled, sealing housing for the SCODAM 200. Several tamper-proof fasteners 212 (e.g., bolts) may be used to securely seal the SCODAM 200 from damage and weathering from the elements. The SCODAM 200 may be adapted to rigidly mount to a floating object by clamping, bolting, or other (mechanical) coupling, in various examples. As depicted, the SCODAM 200 further includes four solar panels 215 fixed to the upper housing 205B. In this exemplary depiction, each solar panel 215 is oriented in increments of 90 degrees relative to other solar panels 215 to achieve a full 360 degrees of solar energy collection.

Fixed at the top portion of the SCODAM 200 is an actuator 235, which may be a navigation light (e.g., an LED), for example. Also fixed at the top portion of the SCODAM 200 is a sensor mast 220. Located at a distal end of the sensor mast is a sensor 225, which may be a wind (speed) sensor, in various embodiments. Further located at the top surface of the SCODAM 200 are (external) wireless communication antennae 230, which may be, by way of example and not limitation, GPS, 3G/4G/5G, LTE/cellular, VHF, satellite antennae, or some combination thereof. As shown in FIG. 2C, the SCODAM 200 may also include an above water sensor module 227 located along the mast 220 and configured to sense various parameters that may be detected above water. In various examples, the above water sensor module 227 may include a (video-)camera or other form of light detector.

Located at the bottom of the SCODAM 200, and integrated with or otherwise fixed to a proximal end of the lower housing 205B, is an exemplary secure coupler 240. The secure coupler 240, in the depicted illustration, is a bolt interface/aperture configured to receive a bolt to mechanically and releasably couple the SCODAM 200 to a flotation device (e.g., the flotation device 255 depicted in FIGS. 2C-2E and described further below). Also located at the bottom of the SCODAM 200 is a below water sensor module 245 configured to sense various parameters that may be detected below water. Further located at the bottom end of the SCODAM 200 is a sealed electrical connector 250 configured to couple to an additional below water sensor unit (e.g., the below water sensor unit 260 shown in FIG. 2C). The connector 250 may be a sealed penetrator connector allowing wire connections from below water sensors (e.g., of the below water sensor unit 260).

As shown in FIGS. 2C-2E, an exemplary ODAS 201 includes the SCODAM 200 fixedly coupled to an exemplary flotation device 255. The flotation device 255 includes a base 255A fixed to an (annular) float 255B. The base 255A may be canister-shaped and sized to contain at least part of the SCODAM 200 (e.g., the lower casing 205B), such that the base 255A may be configured to receive the SCODAM 200 into the interior of the base 255A.

The base 255A is coupled to a below water sensor module 260 via a (chained) link 265 that is coupled at a link coupling point 270 (e.g., a bolted joint connection) at the base 255A. The below water sensor module 260 may include various sensors configured to sense various parameters that may be detected below water. In the depicted example, the below water sensor module 260 is moored via a mooring line 275, which in turn moors the entire ODAS 201. In some embodiments, the mooring line 275 may be directly coupled to the ODAS 201 (e.g., at the coupling point 270), without the intermediate components 260, 265. The distal end of the base 255A is mechanically coupled (directly or indirectly) to the moor line 275 to keep the entire ODAS 201 in a relatively fixed position while floating on a body of water such as a lake, for example. An electrical (wired) connection 280 is also shown that allows for wired data transfer between the below water sensor module 260 and the SCODAM 200 (where the SCODAM 200 is securely retained within the base 255A).

Furthermore, as shown in FIG. 2D, the SCODAM 200 includes, in various embodiments, an at-water-level sensor module 282 configured to sense various parameters that may be detected at water level. In the depicted embodiment, the at-water-level sensor module 282 is fixedly coupled to the rest of the SCODAM 200 via a radially extending mounting bracket 283. As shown in FIG. 2E, the secure coupler 240 is securely fastened to the interior of the base 255A (e.g., via a bolt or screw coupling). The base 225A may include at least one hole or opening 255C, which may permit water to reach the under water sensor 245A of the SCODAM 200. For example, the opening 255C may be a hole through which sensor 245A of the SCODAM 200 may be able to detect various sensed parameters associated with the body of water, such as water speed, salinity, other characteristic of interest, or some combination thereof. In some implementations, the casing 255A in the bottom of the float 255B may be a tube with a lower end open to water for sensor 245A to be suitably exposed to water, yet protected from impacts from external objects in the water (e.g., drift wood, flotsam/jetsam), or tangling with any portion of the mooring system.

FIG. 2E further details a cross-sectional view of the ODAS assembly 201, illustrating various internal features and components of the SCODAM 200 and flotation device 255. The annular float 255B of the flotation device 255 abuts up against the top flange of the bottom casing 205A. A central aperture of the annular float 255B is occupied by the base 255A. The base 255A and the annular float 255B may be fixedly coupled to one another by welding or adhesive, for example. The bottom housing 205A is securely located within an internal cavity of the base 255A.

Figure 4:
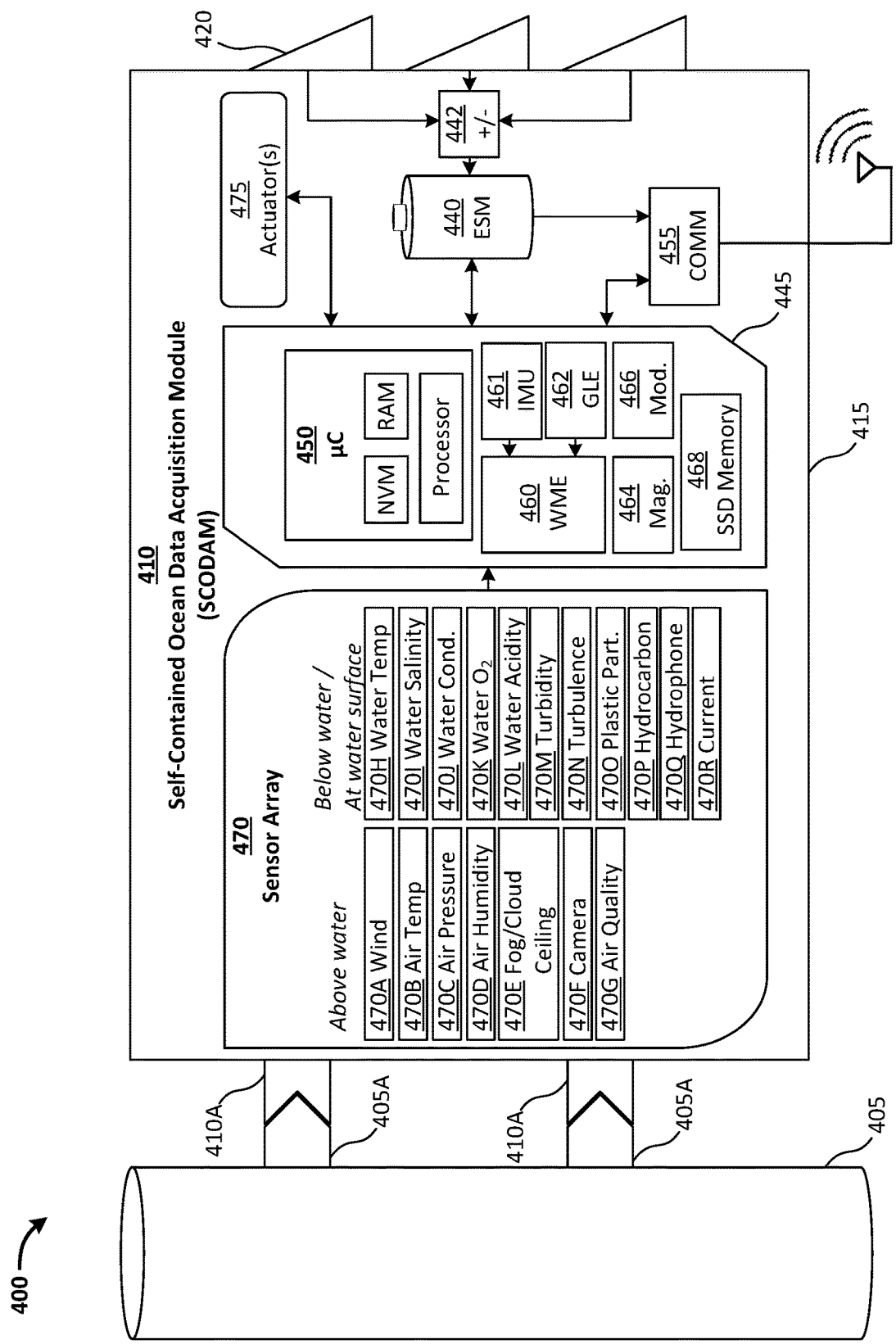
FIG. 4 depicts a diagrammatic view of an exemplary SCODAM securably and releasably coupled to an exemplary floating object, illustrating various illustrative components of the SCODAM.

Within the bottom housing 205A are several internal components and electronics of the SCODAM 200. These components include a power source 285, which may be rechargeable batteries configured to receive charging power from the solar panels 215, in many implementations. The internal components of the SCODAM 200 further include internal electronic components 290 configured to control and coordinate operation of the SCODAM 200. The electronic components 290 may include various sub-components, such as a microcontroller, inertial measurement unit (IMU), and a global positioning system (GPS) module (as shown in FIG. 4), in many examples. The electronics 290 may electrically/operably couple to other components of the SCODAM 200 (e.g., the actuator 235, sensors 225/227, antennae 230) via wired connections 292. In various examples, the SCODAM 200 may further include a waterproof access panel, which may allow access to the internal components of the housing 205B, while also providing a water-tight seal to prevent ingress of water that may damage the electronics 290.

Figure 3A:
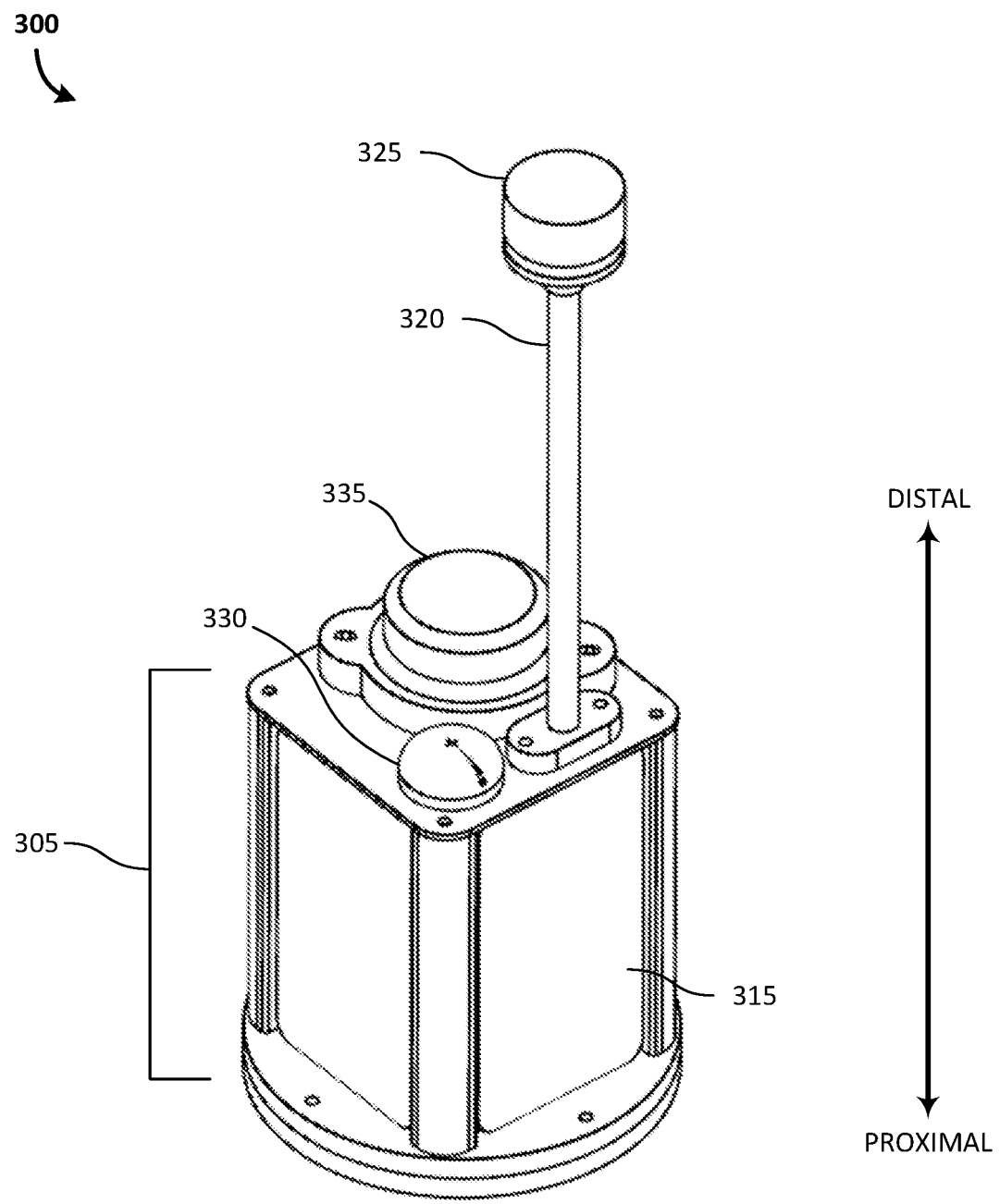
FIGS. 3A, 3B, and 3C depict a top perspective view, side elevational view, and side cross-sectional view, respectively, of an exemplary SCODAM 300 adapted to securely couple to a floating body.
Figure 3B:
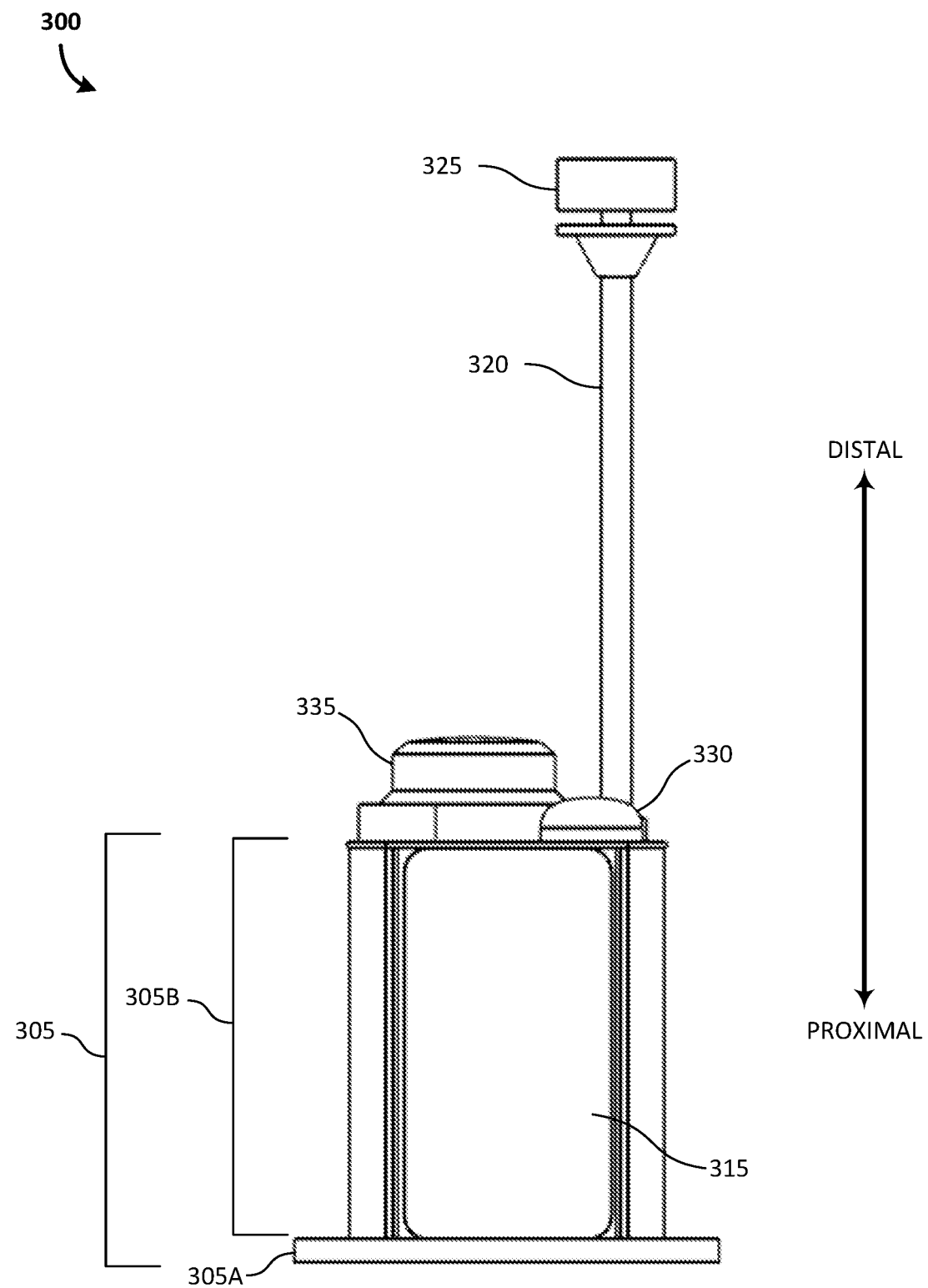
Figure 3C:
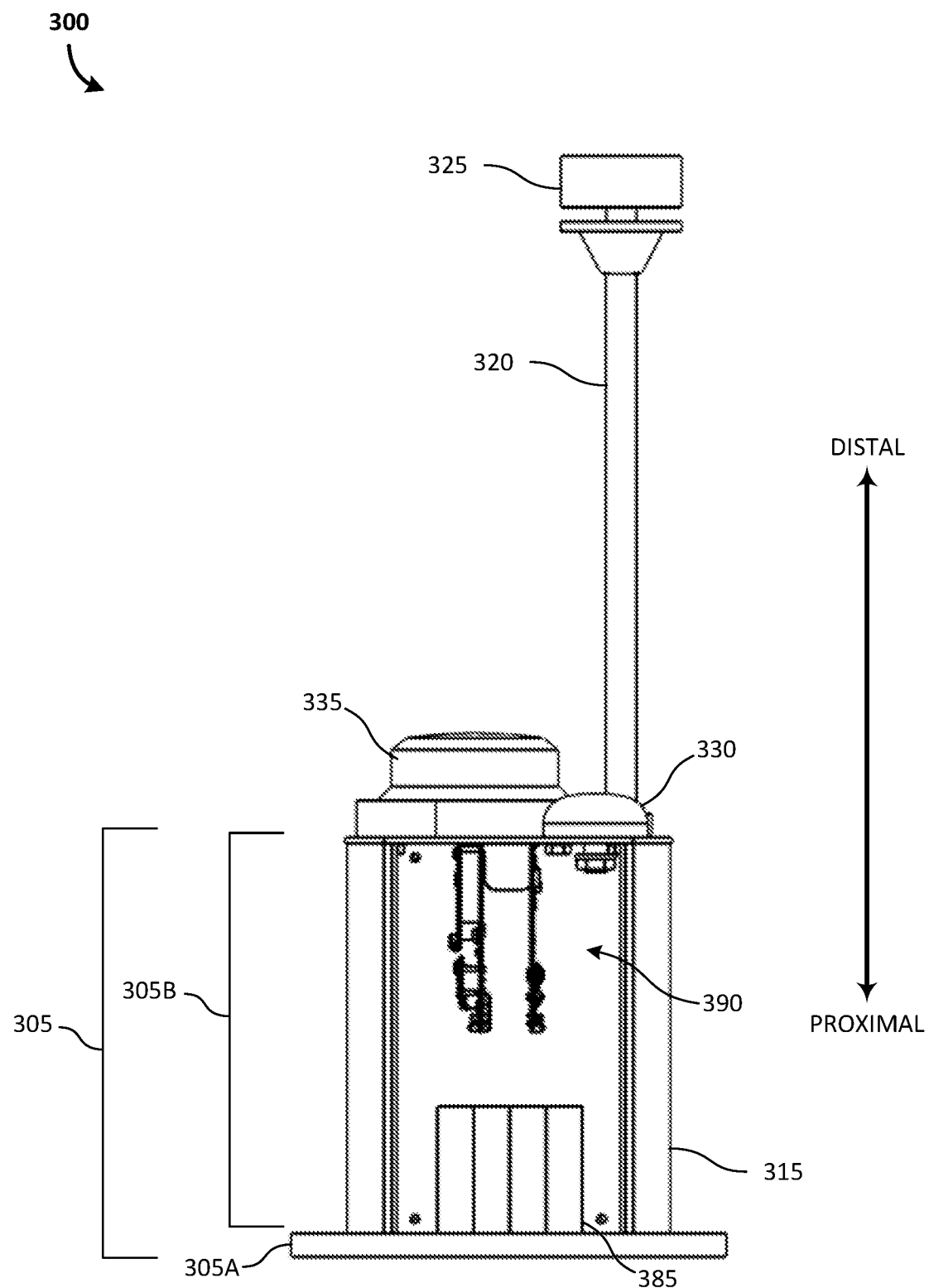

FIGS. 3A, 3B, and 3C depict a top perspective view, side elevational view, and side cross-sectional view, respectively, of an exemplary SCODAM 300 adapted to securely couple to a floating body. The SCODAM 300 may be similar to the SCODAM 200 in various respects (e.g., having sensors, antennae, solar panels). However, the SCODAM 300 differs from the SCODAM 200 in at least one respect, as SCODAM 300 does not possess the lower casing 205A (no lower cylinder, with electronics instead primarily arranged inside a sealed solar module).

Specifically, the SCODAM 300 includes a housing or casing 305, including a bottom closure 305A (e.g., a sealing plate) and an associated upper housing/casing 305B. The upper housing 305B and bottom closure 305A may cooperate to form a sealed (e.g., waterproof, hermetically sealed) and rigid housing for the internal components of the SCODAM 300. Similar to SCODAM 200, several tamper-proof fasteners (e.g., bolts) may be used to securely seal the SCODAM 300 from damage and weathering from the elements. The SCODAM 300 may be adapted to rigidly mount to a floating object by clamping, bolting, or other (mechanical) coupling, in various examples. The SCODAM 300 further includes four solar panels 315 fixed to the upper housing 305B, again similar to SCODAM 200.

Fixed at the top portion of the SCODAM 300 is an actuator 335, which may be a navigation light (e.g., an LED), for example. Also fixed at the top portion of the SCODAM 300 is a sensor mast 320. Located at a distal end of the sensor mast is a sensor 325, which may be a wind (speed) sensor, in various embodiments. Further located at the top surface of the SCODAM 300 are (external) wireless communication antennae 330, which may be, by way of example and not limitation, GPS, 3G/4G/5G, LTE/cellular, VHF, satellite antennae, or some combination thereof. The SCODAM 300 may be mounted to an AtoN or other object similarly to the SCODAM 110D, depicted in FIGS. 1B and 1C.

FIG. 3C further details a cross-sectional view of the SCODAM 300, illustrating the various internal features and components of the SCODAM 300. Within the housing 305B are several internal components and electronics of the SCODAM 300. These components include a power source 385, which may be rechargeable batteries configured to receive charging power from the solar panels 315, in many implementations. The internal components of the SCODAM 300 further include internal electronic components 390 configured to control and coordinate operation of the SCODAM 200. The electronic components 390 may include various sub-components, such as a microcontroller, inertial measurement unit (IMU), and a global positioning system (GPS) module, telemetry unit, and power management electronics (as shown in FIG. 4), in many examples.

FIG. 4 depicts a diagrammatic view of an exemplary SCODAM securably and releasably coupled to an exemplary floating object, illustrating various illustrative components of the SCODAM. An ODAS 400 includes a SCODAM 410 securely coupled to a floating object 405 (such as a cylindrical upper portion of a spar-type navigational channel marker buoy on a lake, for example). The SCODAM 410 is securely, yet releasably coupled to the floating object 405 via a pair of (first) mechanical interfaces 410A of the SCODAM 410, in cooperation with a pair of complementary (second)

mechanical interfaces 405A of the floating object 405. In an illustrative example, the first interfaces 410A and second interfaces 405A may be U-bolts and associated contoured receiver clamp.

The SCODAM 410 includes the SCODAM housing or casing 415. The SCODAM 410 includes an energy conversion module (ECM) 420 configured to convert ambient energy inputs to electrical energy. In the depicted example, the ECM 420 includes solar panels located on a side of the casing 415. The solar panels 420 are configured to deliver charging power to an energy storage module (ESM) 440 within the casing. The ECM, ESM, or both may include circuitry to condition the electrical energy converted by the ECM to a preferred form (e.g., for storage, for operation of one or more portions of the SCODAM, conversion from AC to DC or vice versa, step-up/step-down of voltage/current, filtering, modulation). In the depicted example, a charge controller 455 may be configured to manage the charging of the ESM 440 by the solar panels 420.

Fixedly mounted within the casing 415 is an electronics circuit 445. The electronics circuit, as depicted is an electronic circuit board 445, which may be a printed circuit board (PCB) and/or a system on a chip (SoC). Operably coupled to the board 445 is a microprocessor 450 having a processor, volatile memory (RAM), and nonvolatile memory (NVM). The microcontroller 450, as well as other components of the SCODAM 410, may receive operating power from the ESM 440. The microcontroller 450 is further coupled to a communication module (COMM) 455, which may, for example, be configured to perform various input/output (I/O) functions. The COMM 455 may include, for example, at least one antenna (transceiver) configured to transmit and/or receive data to/from a radio receiving/transmitting source, such as a satellite in orbit, for example. In this sense, the SCODAM 410 may be configured as an Internet of Things (IoT) device that uses wireless data transmission to operably interface with the cloud for massive data collection and analysis projects and initiatives. The COMM 455 may, for example, transmit data as available, at a predetermined frequency, or some combination thereof. By way of example and not limitation, the COMM 455 may transmit data daily, hourly, per minute, per second, or more.

Operably coupled to the board 445 are further (sub-) components that contribute to various aspects of the functioning and data-collection of the SCODAM 410. For example, various embodiments may include a wave measurement engine (WME) 460 configured to collect data related to measurement of wave dynamics. As depicted, WME 460 includes an inertial measurement unit (IMU) 461 (e.g., including accelerometers for measuring velocity/acceleration and direction). Various embodiments may include a geospatial location engine (GLE) 462 for tracking the location of the SCODAM 410.

The GLE 462 may, for example, include circuits configured to geospatially locate the SCODAM 410 via one or more global navigational satellite systems (GNSSs). Exemplary GNSS systems include, by way of example and not limitation, the US global positioning satellite (GPS) system, the European Union's Galileo constellation, Russia's global navigation satellite system (GLONASS), China's BeiDou system, Japan's Quasi-Zenith Satellite System (QZSS), India's Indian Regional Navigation Satellite System/Navigation with Indian Constellation (IRNSS/NAVIC), or some combination thereof.

In the depicted embodiment, the WME 460 is operably coupled to the GLE 462, and may, for example, be configured to determine wave dynamics according to data received from the GLE 462. The GLE 462 may, for example, communicate with one or more GNSS systems on a predetermined schedule, as able, or some combination thereof. The GLE 462 may, for example, determine location weekly, daily, hourly, per minute, per second, or some combination thereof. For example, in various embodiments (e.g., in some embodiments in which the GLE 462 provides data for use by the WME 460) the GLE 462 may be scheduled, by way of example and not limitation, to obtain geospatial location data multiple times per second (e.g., one, two, three, four, five, or more times per second).

Various embodiments may include a magnetometer 464 for measuring a magnetic position/orientation of the SCODAM 410, which may be part of the GLE 462, the WME 460, or some combination thereof. Various embodiments may include a cellular or satellite modem 466 for communicatively interfacing with a cell tower or satellite, which may be, for example, part of the COMM 455. Various embodiments may include a memory store 468, such as a solid-state drive (SSD) or flash drive, configured to store the data collected by the SCODAM 410 (according to the operations executed by the microcontroller 450).

The SCODAM 410 further includes an array of sensors 470 configured to collect a plethora of empirical data of various sensed parameters that may be used to perform various body of water characterization operations to accurately and effectively evaluate the real-time status of a target body of water. Sensors may generally be divided into above water sensors, below water sensors, and, in some cases, at surface sensors. Examples of above water sensors may include, by way of example and not limitation, wind (velocity) sensors 470A, air temperature sensors 470B, air pressure sensors 470C, air humidity sensors 470D, fog/cloud ceiling sensors 470E, cameras 470F (e.g., CMOS sensors), and air quality sensors 470G. Examples of below water surface and/or at-water-surface sensors may include, by way of example and not limitation, water temperature sensors 470H, salinity level sensors 470I, water conductivity sensors 470J, water oxygen level sensors 470K, water acidity level sensors 470L, water turbidity sensors 470M, water turbulence sensors 470N, plastic particulate sensors 470O, hydrocarbon sensors 470P, hydrophone or acoustic sensors 470Q, and water current (velocity) sensors 470R.

Figure 5:
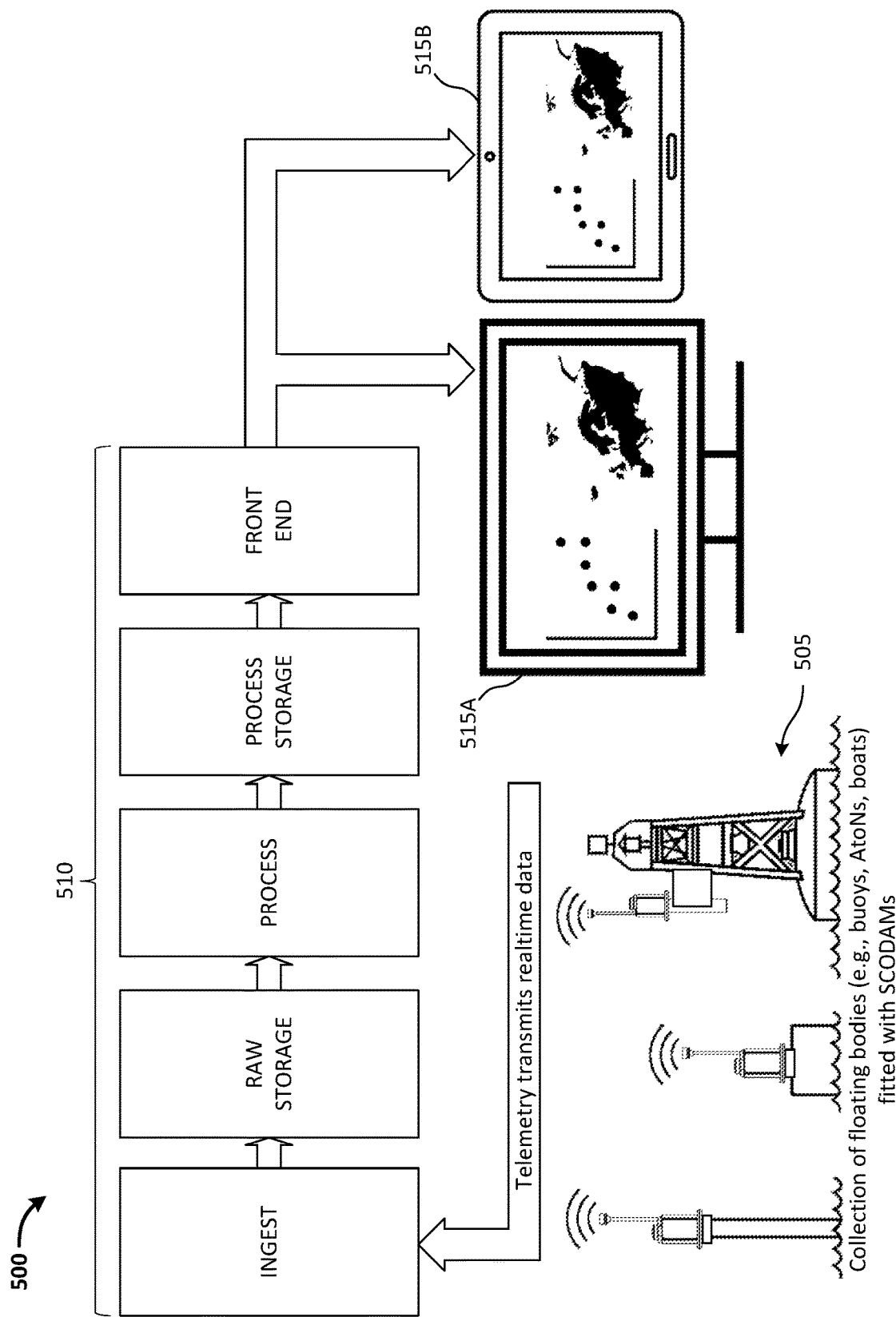
FIG. 5 depicts a diagrammatic view of exemplary field-deployed SCODAMs mounted to various floating objects, the field-deployed SCODAMs performing sensing operations and transmitting telemetry data to a computing system, which then processes the data for output to a remote user device.

FIG. 5 depicts a diagrammatic view of exemplary field-deployed SCODAMs mounted to various floating objects, the field-deployed SCODAMs performing sensing operations and transmitting telemetry data to a computing system, which then processes the data for output to a remote user device. A data flow system 500 includes an ODAS fleet 505 configured to collect parametric data relating to a wide array of measured/sensed parameters, such as those described above with reference to FIG. 4. In various examples, 2, 5, 10, 20, 30, 40, or 50 or more ODASes may be deployed on a target body of water (e.g., a high-salinity sea) as a single ODAS fleet 505, to advantageously obtain a relatively large amount of parametric data (e.g., multiple data points, each associated with an individually deployed ODAS), which may be usefully used to accurately model and characterize the target body of water.

The wireless transmitter of each ODAS in the ODAS fleet 505 transmits (near) real-time telemetry/parametric data to a computing and data storage system 510 (e.g., via the cell tower 125 and network 130 depicted in FIG. 1). The system 510 is configured to (1) ingest the raw (or preprocessed) data from the ODAS fleet, (2) store the data (e.g., in a database, collection of databases, or in the cloud), (3) process the data according to various computer algorithms and computational processes, (4) process the stored data, and (5) transmit the processed data to a front end, for eventual consumption and analysis at a user device (such as a desktop computer 515A or tablet computer 515B). By utilizing the massive, real-time, empirical data input stream from the sensor arrays of the ODAS fleet 505, the data flow system 500 may advantageously provide invaluable and timely insights to relevant decision-makers using intelligent, data-driven processes and algorithms that accurately characterize and monitor a target body of water.

Figure 6:
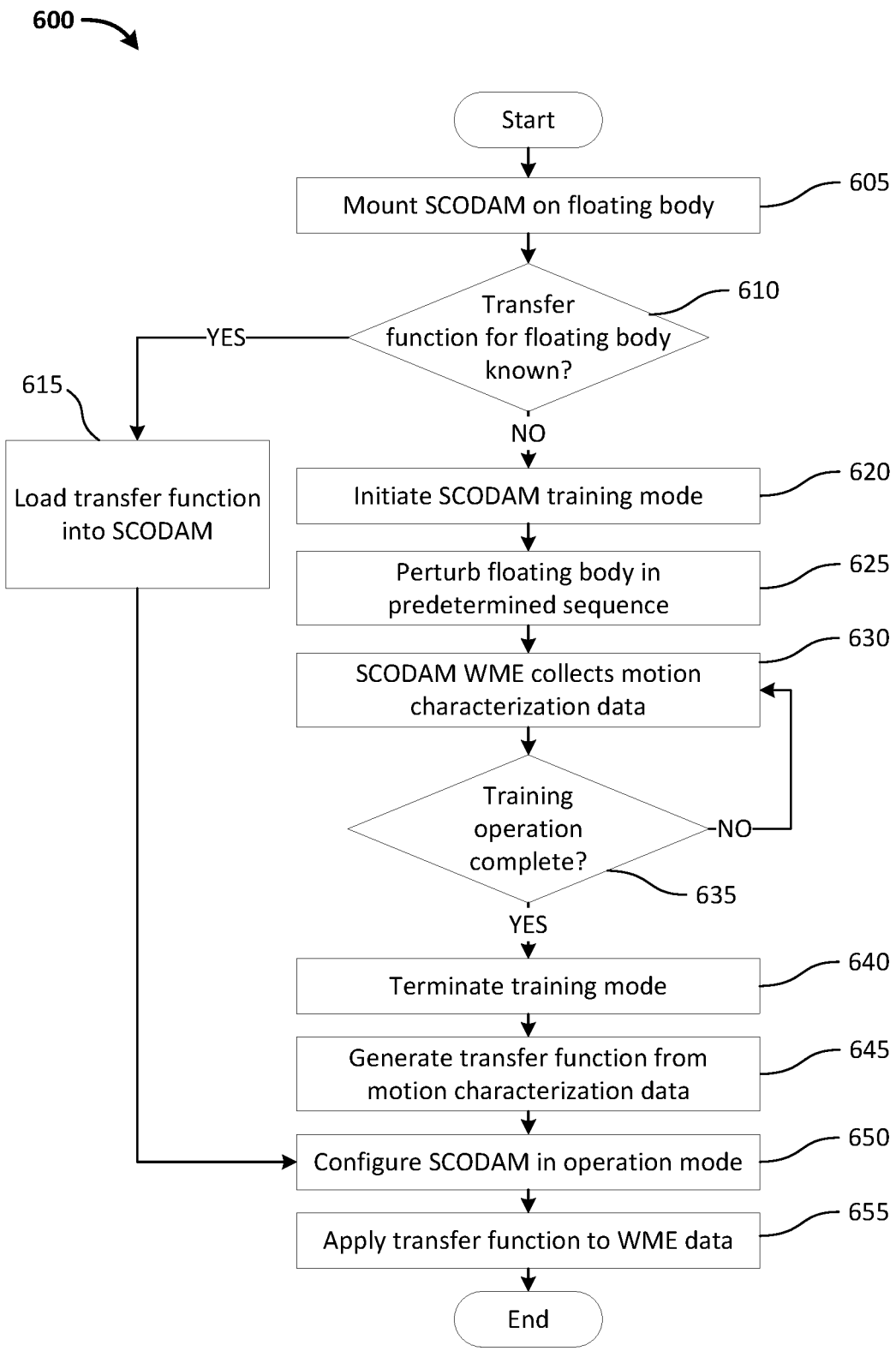
FIG. 6 depicts an exemplary method of deploying an illustrative SCODAM on a floating body, including characterization of motion of the floating body during a training operation.

FIG. 6 depicts an exemplary method of deploying an illustrative SCODAM on a floating body, including characterization of motion of the floating body during a training operation. Method 600 begins by mounting 605 a SCODAM on a floating body. The SCODAM may, for example, be mounted by a housing of the SCODAM as a single body. The SCODAM may, for example, be mounted on an existing floating body such as a buoy. if a transfer function characterizing motion of the floating body is known 610, then the transfer function is loaded 615 into the SCODAM. For example, transfer function may be loaded into a control module, such as microprocessor 450 as discussed in FIG. 4. If no transfer function is known 610, the training mode is initiated 620. The training mode may, for example, be initiated by an input from a user. The input may be provided, by way of example and not limitation, via input hardware on this code AM, via a remote input (e.g., smart phone, tablet, computer), or some combination thereof.

Once the SCODAM is in training mode, the floating body is perturbed in a predetermined sequence 625. A wave measurement engine (WME, e.g., 460 in FIG. 4) of the SCODAM collects motion characterization data 630 during the perturbation sequence. The predetermined sequence may, for example, include perturbations along one or more axes, in a rotational manner (e.g., including 'heeling'), elliptical motions, other appropriate perturbations, or some combination thereof. The perturbations may, for example, be predetermined to induce motion of the floating body sufficient for the WME to capture motion characterization data sufficient to identify motion characteristics of the floating body.

If the training operation is not complete 635, then the WME continues to collect motion characterization data 630. If the training operation is complete 635, then the training mode is terminated 640. The motion characterization data collected by the WME is then used to generate a transfer function 645 characterizing the floating body's motion. The transfer function may, for example, be a single function, be a component of a function, be a plurality of transfer functions, be at least one coefficient of a function, or some combination thereof. The transfer function may characterize motion attributes of the floating body related to vertical displacement, rotation, horizontal translation, are there appropriate dynamics, or some combination thereof. In various embodiments, the transfer function may be at least partially dynamically determined while the SCODAM is in a training mode, may be generated by tuning a default transfer function, may be generated by the SCODAM, may be generated on a remote device to which the SCODAM transmits ocean characterization data collected by the WME during and/or after termination of the training mode, or some combination thereof.

Once the transfer function is generated 645, the SCODAM is configured in an operation mode 650. The SCODAM may be configured in an operation mode, for example, by saving the transfer function in a data store (e.g., SSD Memory 468 of FIG. 4), loading it into memory (e.g., NVM of microcontroller 450 of FIG. 4), or some combination thereof. In operation mode, the transfer function is applied to data collected by the WME to determine wave motion. The transfer function may, for example, be applied by the WME, by a separate control circuit, within the SCODAM, on one or more remote devices, or some combination thereof. Application of the transfer function may, for example, advantageously allow wave motion to be accurately determined from data collected by the WME. The transfer function may, for example, advantageously isolate wave dynamics from effects of placement of the SCODAM, from effects of construction of the floating body (e.g., "hard iron" effects), from particular motion characteristics of the floating body, or some combination thereof. In various embodiments, the training mode and associated training operation(s) may advantageously permit a floating body to be converted to an ODAS by use of a SCODAM without the need for a trainer buoy. In various embodiments, the generation of a transfer function(s) may advantageously enable accurate measurement of wave dynamics under various conditions such as, by way of example and not limitation, extended heeling of a floating body (e.g., in severe storms). In various embodiments, the characterization of the floating body may advantageously enable accurate wave measurements from floating bodies with shapes more difficult to characterize such as, for example, boat-shaped environmental monitoring buoys.

In various embodiments the training operation may be performed in the field. Accordingly, training operation may advantageously permit rapid field deployment of one or more SCODAMs on respective floating bodies. The following bodies may, for example, be existing floating bodies such as aids to navigation. In various embodiments a combination of a self-contained module (SCODAM) with onboard power, and a field deployable training mode to tune the WME to a particular floating body and/or location may advantageously decrease cost in time to deploy ODASs. Accordingly, various embodiments may advantageously enable a greater number of ODASs to be deployed, and correspondingly greater amounts of data to be obtained. various embodiments may, therefore, increase public safety by enabling early warning of environmental hazards (e.g., storms), decrease costs of shipping and transportation (e.g., by notifying transportation companies of potential delay-inducing conditions), or some combination thereof.

In various embodiments a SCODAM may, for example, be deployed or exchanged in the field, as discussed in more detail previously. In some embodiments, a transfer function(s) of the previous SCODAM may, by way of example and not limitation, be transferred to the new SCODAM, a training operation(s) may be repeated, or some combination thereof. For example, the transfer function(s) may be locally transferred (e.g., direct link between previous and new SCODAM, via an intermediary such as a laptop, direct transfer of a data store such as SSD 468 of FIG. 4), remotely (e.g., via a network), or some combination thereof. In some embodiments, the transfer function(s) may not be stored on the SCODAM. In various embodiments, at least some portion of the training operations may be initiated remotely.

Although various embodiments have been described with reference to the figures, other embodiments are possible. For example, in various embodiments an energy conversion module may be a passive energy collection module. By way of example and not limitation, a passive energy collection module may be configured to, for example, collect energy from light, wind, wave motion, or some combination thereof. In various embodiments an energy conversion module may be configured as a fuel cell. For example, the fuel cell may be configured to convert an energy input such as methanol without combustion. Accordingly, various such embodiments may advantageously be deployed, for example, in frigid environments where limited sunlight and low temperatures may interfere with traditional use of other forms of energy conversion and/or storage (e.g., lithium-ion batteries). In various embodiments, an energy source using combustion of a fuel may be employed. In various embodiments, the ECM may be configured with no moving parts, or fewer moving parts than an internal combustion engine. Such embodiments may, for example, advantageously increase durability of the SCODAM in harsh environments and/or reduce maintenance requirements.

In various embodiments, the transfer function(s) may represent a dynamics model of the floating body. A dynamics model may, for example, be based on a combination of a priori knowledge and in situ testing of the floating body. The dynamics model may then, for example, be applied to create transfer functions that enable conversion of measurements of the floating body motions into measurements of the water waves. By way of example and not limitation, the characterization may include the following steps: estimate the characterization using a priori knowledge including floating body geometry, water depth, mooring line length, mass properties, or some combination thereof; refine the characterization using in situ field testing data (e.g., the method described in relation to FIG. 6), and optimize characterization using cumulative in situ data from longer term collection (e.g., from analysis of data collected in an operation mode, an extended training mode, an operation mode, or some combination thereof).

In various embodiments, floating body motion characterization, such as is described in relation to FIG. 6, may be repeated multiple times. Perturbation may, for example, not be predetermined. In some embodiments, perturbation may be predetermined in duration, cycles, amount of displacement and/or rotation relative to a resting position, or some combination thereof. In various embodiments, the training operation may be required to be performed on a substantially calm body of water such as, for example, when substantially no waves are present. Perturbation may, by way of example and not limitation, be performed by hands and/or feet of an operator(s), a pole, a rope, a mechanism (e.g., a vessel fitted with deployment mechanisms such as a crane), or some combination thereof. In various embodiments, the training mode may further involve an operator observing a time when the floating body begins freely decaying motion after perturbation. The transfer function may, for example, be determined based on the time(s) when freely decaying motion begins.

In various embodiments, deployment of a SCODAM on a floating body may, for example, include a priori calculation of hydrodynamic properties using floating body geometry (e.g., from spec sheets, direct measurement). Once the SCODAM is rigidly mounted on the floating body, in situ training may be executed (e.g., as described in relation to FIG. 6). A characterization algorithm may be applied to the a priori hydrodynamic properties and in situ test results to generate a characterized dynamics model for the floating body. The characterized dynamics model may be used to generate one or more floating body transfer functions from wave to motion. The SCODAM may, in an operation mode, transmit real time motion data (e.g., collected by WME 460, IMU 461, and/or GLE 462 described in relation to FIG. 4) to one or more remote devices. The transfer function(s) may be applied to the motion data to calculate standardized wave properties from the generic floating body. The transfer functions may, for example, operate in the frequency domain, and may, by way of example and not limitation, be used to generate wave spectra data from motion spectra data.

In various embodiments, some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-255A, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Although various embodiments have been described with reference to the Figures, other embodiments are possible. A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. An apparatus comprising a self-contained ocean data and acquisition module (SCODAM) comprising:
    a sensor array;
    a geospatial locating engine;
    a wave measurement engine comprising an inertial measurement unit;
    a communication engine configured to transmit data collected by the sensor array, wave measurement engine, and geospatial locating engine to at least one remote device;
    a passive energy collection module adapted to convert ambient energy inputs into electrical energy;
    an energy storage module coupled to the energy collection module and configured to receive the converted electrical energy and to supply operating power to the SCODAM; and,
    a hermetically sealed housing,
    wherein:
        at least some portion of each of the sensor array, the geospatial locating engine, the wave measurement engine, the communication engine, and the energy storage module are disposed within the housing, and at least some portion of the passive energy collection module is configured to be disposed about the housing, and
        the SCODAM is a single, self-contained unit configured to mount to a separate floating body when the housing is coupled to the floating body.

2. The apparatus of claim 1, the SCODAM further comprising a control circuit connected to the wave measurement engine and comprising:
    a memory module stored with a program of instructions; and,
    a processor electrically coupled to the memory module and configured to execute the program of instructions to perform a program of operations to characterize a floating body to which the SCODAM is mounted, the operations comprising:
        in response to initiation of a training mode, receiving motion characterization data from the wave measurement engine, the motion characterization data corresponding to motion of the floating body in response to perturbation of the floating body in a predetermined sequence;
        generating from the motion characterization data a transfer function corresponding to motion characteristics of the floating body; and,
        in an operating mode, applying the transfer function to wave measurement data received from the wave measurement engine to determine wave motion as a function of the transfer function.

3. An apparatus comprising a self-contained ocean data and acquisition module (SCODAM) comprising:
    a sensor array;
    a geospatial locating engine;
    a wave measurement engine;
    a communication engine configured to transmit data collected by the sensor array, wave measurement engine, and geospatial locating engine to at least one remote device;
    an energy conversion module adapted to convert ambient energy inputs into electrical energy; and,
    an energy storage module coupled to the energy collection module and configured to receive the converted electrical energy and to supply operating power to the SCODAM, wherein the SCODAM is a single unit configured to mount to a separate floating body.

4. The apparatus of claim 3, wherein the geospatial locating engine is configured to determine geospatial location of the SCODAM via at least one global navigation satellite system (GNSS).

5. The apparatus of claim 3, wherein the wave measurement engine is operably connected to the geospatial locating engine and is configured to determine wave motion from data received from the geospatial locating engine.

6. The apparatus of claim 3, wherein the wave measurement engine comprises an inertial measurement unit.

7. The apparatus of claim 3, wherein the energy conversion module is a passive energy collection module.

8. The apparatus of claim 7, wherein the passive energy collection module comprises at least one solar panel, and the ambient energy inputs comprise light.

9. The apparatus of claim 7, wherein the ambient energy inputs comprise at least one of: wind and wave motion.

10. The apparatus of claim 3, wherein the energy conversion module is a fuel cell.

11. The apparatus of claim 3, wherein the floating body is a buoyant aid to navigation.

12. The apparatus of claim 3, further comprising at least one accessory sensor, wherein the accessory sensor is operably coupled to the SCODAM.

13. The apparatus of claim 12, wherein the accessory sensor is configured to be in contact with a body of water when the floating body is disposed therein.

14. The apparatus of claim 3, the SCODAM further comprising a hermetically sealed housing, wherein at least some portion of each of the sensor array, the geospatial locating engine, the wave measurement engine, the communication engine, and the energy storage module are disposed within the housing, and at least some portion of the energy conversion module is configured to be disposed about the housing.

15. The apparatus of claim 14, wherein the SCODAM is configured to be mounted to the floating body by the housing.

16. The apparatus of claim 14, the SCODAM further comprising a navigation light, wherein the navigation light is powered by the energy storage module and is mounted on the housing.

17. The apparatus of claim 3, the SCODAM further comprising a mast comprising at least some portion of the sensor array disposed therein.

18. The apparatus of claim 3, the SCODAM further comprising a control circuit connected to the wave measurement engine and comprising:
a memory module stored with a program of instructions; and,
a processor electrically coupled to the memory module and configured to execute the program of instructions to perform a program of operations to characterize a floating body to which the SCODAM is mounted, the operations comprising:
in response to initiation of a training mode, receiving motion characterization data from the wave measurement engine, the motion characterization data corresponding to motion of the floating body in response to perturbation of the floating body in a predetermined sequence;
generating from the motion characterization data a transfer function corresponding to motion characteristics of the floating body; and,
in an operating mode, applying the transfer function to wave measurement data received from the wave measurement engine to determine wave motion as a function of the transfer function.

19. A method for deploying an existing floating body as an ocean data acquisition apparatus, the method comprising:
providing a self-contained ocean data and acquisition module (SCODAM) as a single unit, the SCODAM comprising:
a sensor array,
a geospatial locating engine,
a wave measurement engine,
a communication engine configured to transmit data collected by the sensor array, wave measurement engine, and geospatial locating engine to at least one remote device,
an energy conversion module adapted to convert ambient energy inputs into electrical energy, and
an energy storage module coupled to the energy collection module and configured to receive the converted electrical energy and to supply operating power to the SCODAM; and,
mounting the SCODAM to a separate floating body as the single unit.

20. The method of claim 19, further comprising:
initiating a training operation of the SCODAM, comprising causing the SCODAM to enter a training mode;
during the training operation, manipulating the floating body in a predetermined perturbation sequence such that the SCODAM obtains, via the wave measurement engine, motion characterization data corresponding to motion of the floating body during the perturbation, and generates from the motion characterization data a transfer function corresponding to motion characteristics of the floating body; and,
operating the SCODAM to enter an operating mode such that the SCODAM applies the transfer function to wave measurement data received from the wave measurement engine to determine wave motion as a function of the transfer function.

* * * * *